Dec. 15, 1942.   G. H. HARRED   2,305,419
WIRE STITCHING MACHINE
Filed Sept. 9, 1942   9 Sheets-Sheet 1

Inventor:
George H. Harred
By
Attorneys.

Inventor:
George H. Harred

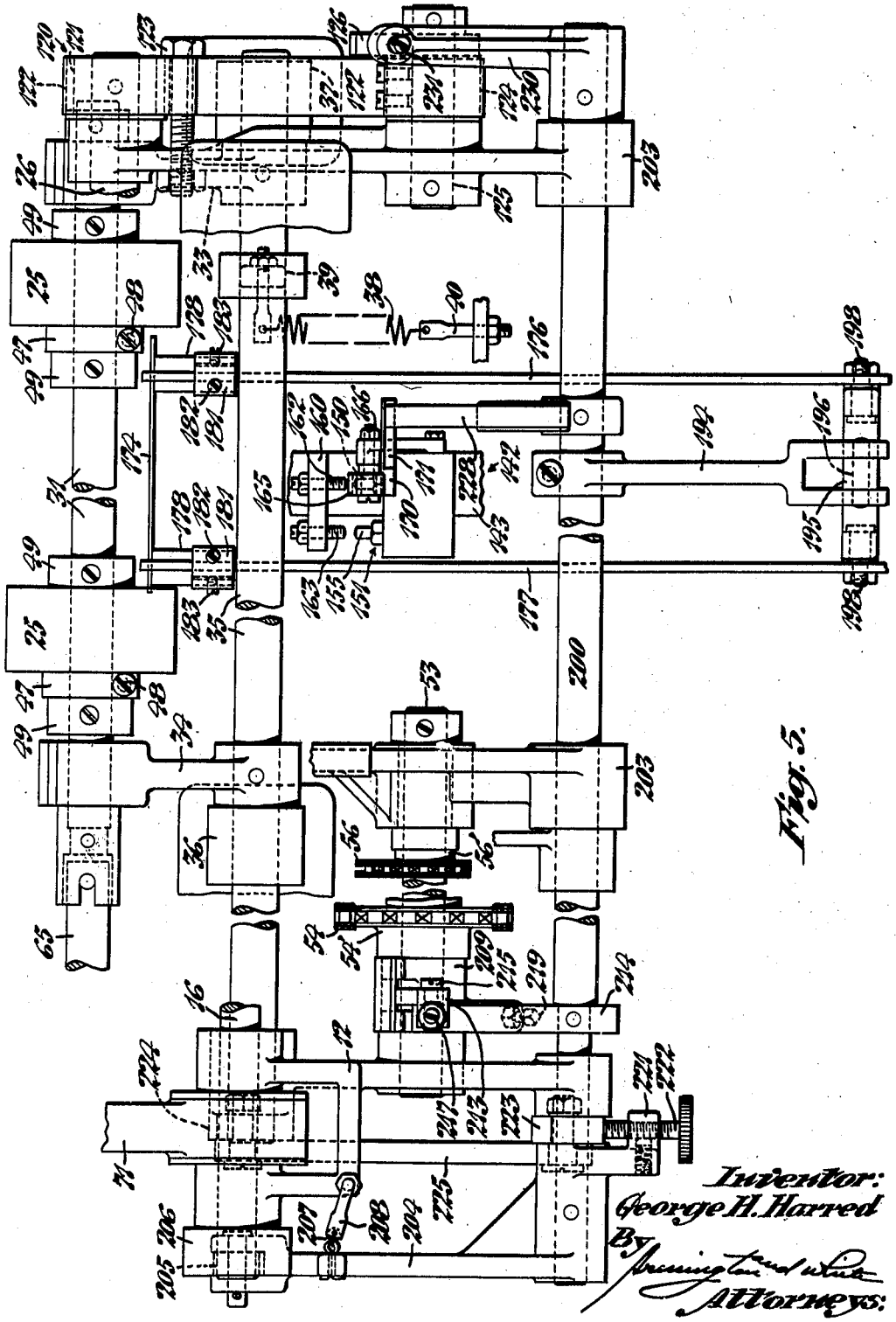

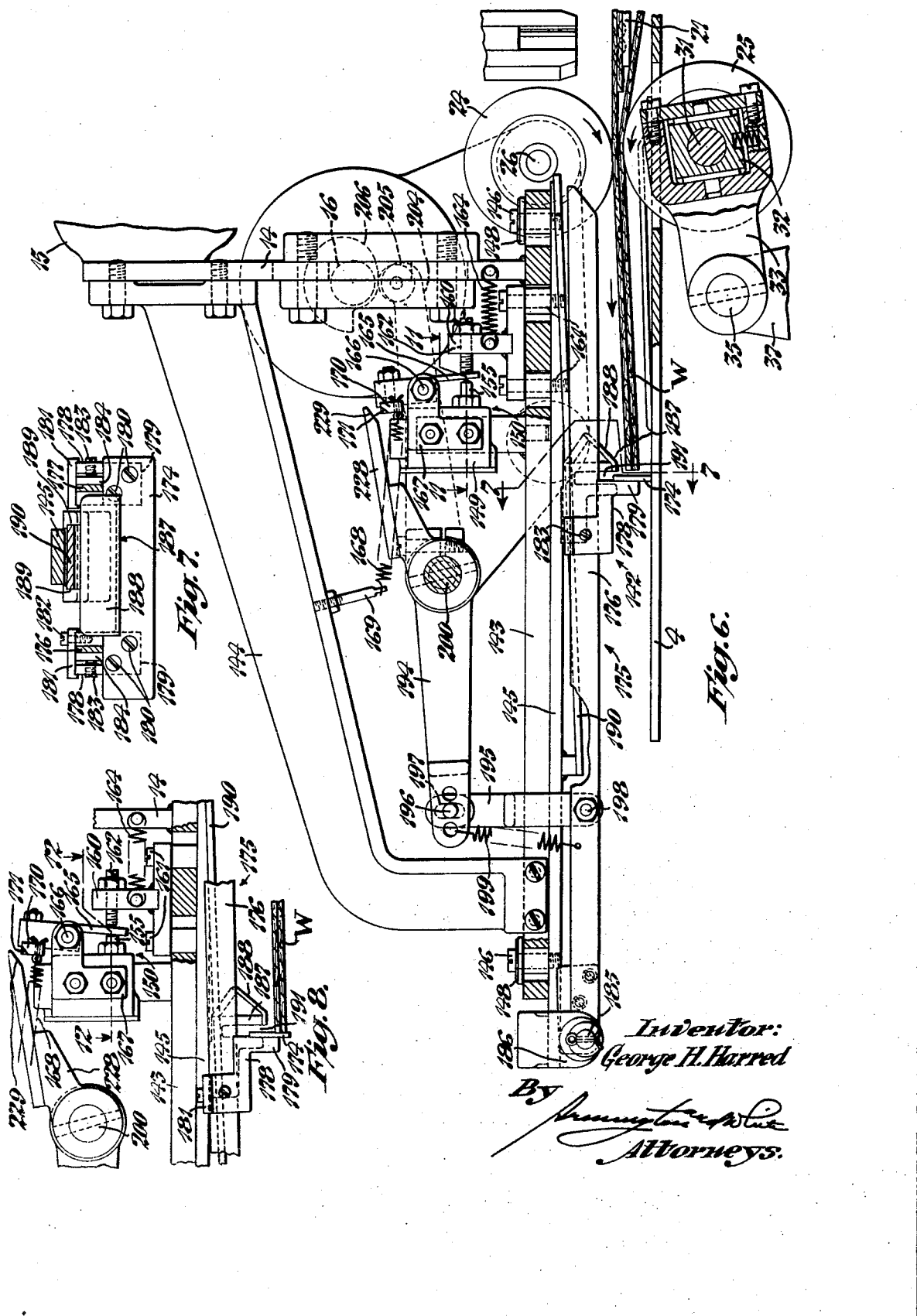

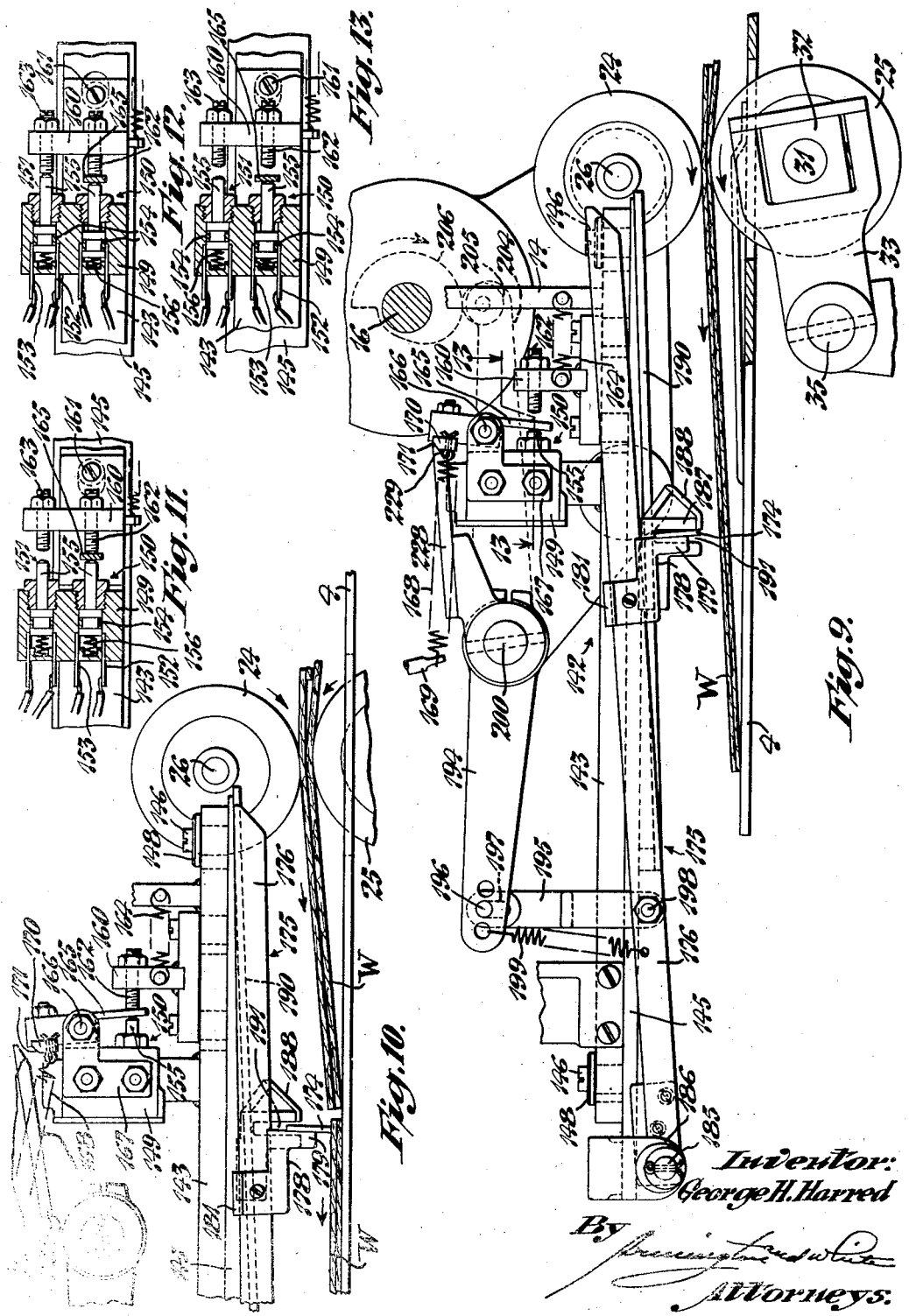

Dec. 15, 1942.  G. H. HARRED  2,305,419
WIRE STITCHING MACHINE
Filed Sept. 9, 1942  9 Sheets-Sheet 7

Inventor:
George H. Harred
By
Attorneys.

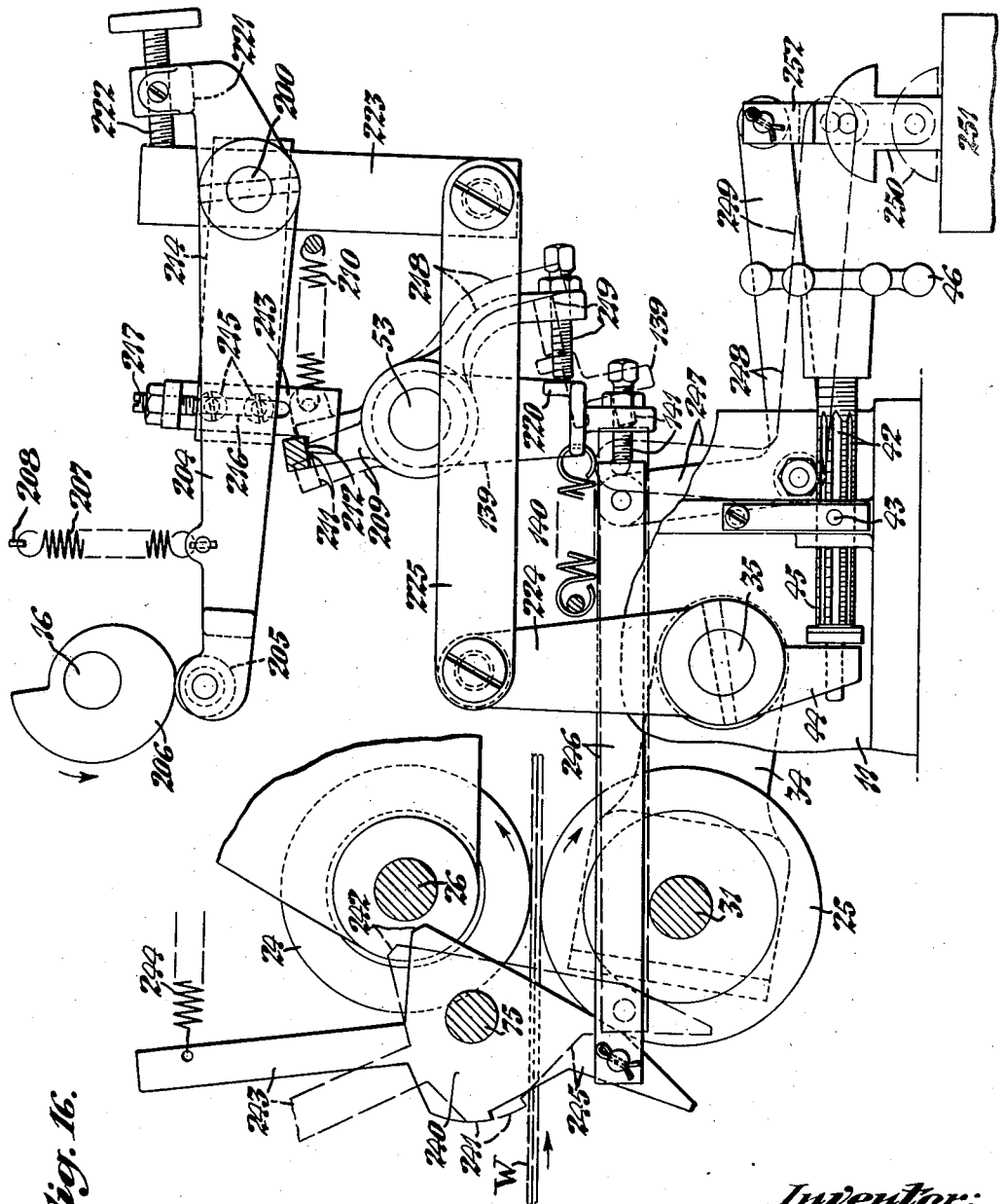

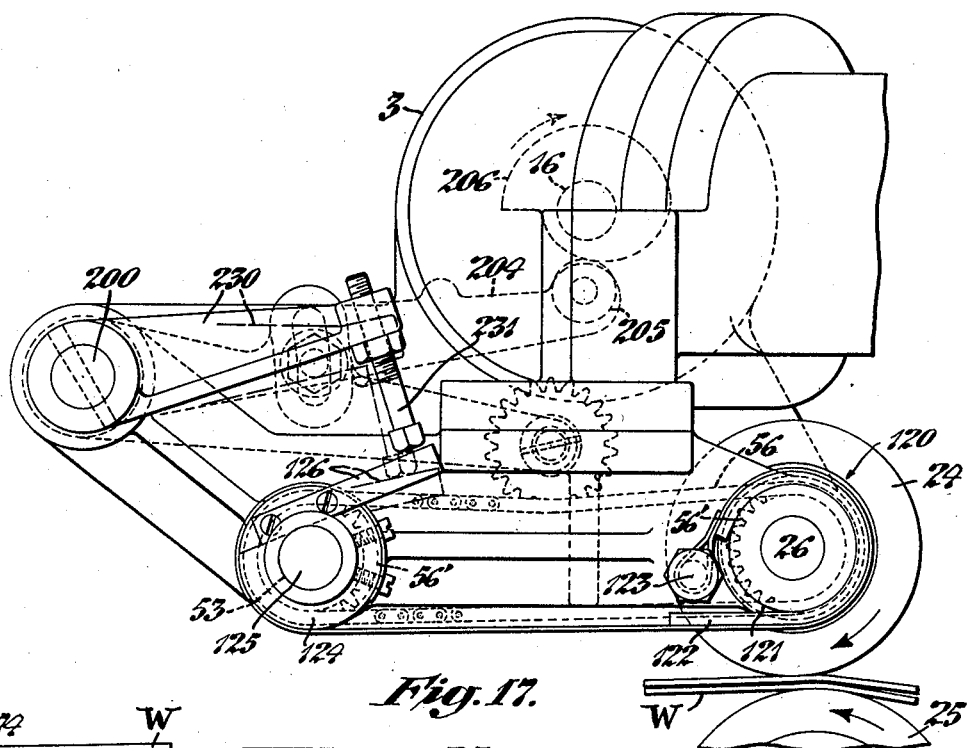

Patented Dec. 15, 1942

2,305,419

UNITED STATES PATENT OFFICE 2,305,419

WIRE-STITCHING MACHINE

George H. Harred, East Greenwich, R. I., assignor to Boston Wire Stitcher Company, Portland, Maine, a corporation of Maine Application September 9, 1942, Serial No. 457,704

37 Claims. (Cl. 1—11)

The present invention relates to wire-stitching machines for stitching the seams of boxes and cartons and more particularly to improvements in wire-stitching machines of the type illustrated and described in my copending application for United States Letters Patent, Serial No. 392,928, filed May 10, 1941.

The machine illustrated and described in my prior application, referred to above, embodies a single set of feed-rolls which are adapted to be driven alternately by continuously operating high speed driving means and intermittently operating step-feed driving means. The feed-rolls when driven by the high speed driving means are adapted to feed a carton-blank against the depending gate of a gauge which operates to disconnect the feed-rolls from the continuously operating high speed driving means, connect the feed-rolls to be driven by the intermittently operating driving means and initiate the operation of the wire-stitching means for stitching together the folded sides of the carton-blank. The intermittently operating feed-rolls then function to step-feed the carton-blank to cause the stitches to be applied in spaced relationship by the wire-stitching means. After the first stitch is applied the depending gate of the gauge is released to permit it to pivot so that the carton-blank may pass thereunder. The wire-stitching means continues to operate until a predetermined number of stitches have been applied, at which time a suitable control means operates to arrest the stitching operation, disconnect the feed-rolls from the intermittently operating driving means and connect the feed-rolls to be driven by the continuously operating driving means. The continuously operated feed-rolls then act to discharge the stitched carton from the machine and feed another carton-blank against the depending gate of the gauge.

Such machines have been used extensively and are quite satisfactory for most purposes. With certain types of light-weight carton-blanks, however, the forward edges of the blanks are sometimes crushed as they are forced against the depending gate of the gauge. With carton-blanks which are particularly easy to handle it is possible to feed a second carton-blank so close the blank being stitched that the pivoted gate of the gauge is not permitted to swing back to vertical position between the blanks. As a result, the second carton-blank is immediately discharged from the machine without being stitched. Furthermore, due to the high speed at which the machine operates and the back-lash in the feed-rolls the spacing between the stitches may vary slightly in the stitched carton-blanks.

One of the objects of the present invention is to provide an improved machine of the type indicated in which cartons are folded and applied thereto manually and which thereafter operates automatically to feed, stitch and discharge the cartons from the machine.

Another object is to provide a machine of the type indicated in which a single set of feed-rolls are adapted to feed the work into and out from the machine at high speed and to step-feed the work during the stitching operation.

Another object is to provide a machine of the type indicated which is operable automatically to apply a predetermined number of stitches to the work during a stitching operation.

Another object is to provide a machine of the type indicated having a gauge adapted to be operated by a carton-blank inserted into the machine closely adjacent the carton-blank being stitched.

Another object is to provide a gauge of the type indicated which is operated by the work for initiating the disconnection of the continuously operating driving means from the feed-rolls and the connection of the intermittently operating driving means therewith to step-feed the work between stitches.

Another object is to provide a gauge of the type indicated which is operable to initiate the wire-stitching operation after the intermittently operating driving means has been connected to the feed-rolls.

Another object is to provide a gauge of the type indicated which is adjustable to accommodate carton-blanks of different sizes and shapes.

Another object is to provide a machine of the type indicated with means automatically operable after the initiation of the operation of the wire-stitching means to hold the feed-rolls connected to the intermittently operating driving means and withdraw the gauge from the path of movement of the work.

Another object is to provide a machine of the type indicated with a stripper to prevent the work from moving with the gauge as the latter is withdrawn.

Another object is to provide a machine of the type indicated with opposed feed-rolls which normally are spaced so as to grip the work lightly to feed it to the wire-stitching means and movable toward each other to grip the work more tightly during a stitching operation.

Another object is to provide a machine of the type indicated with braking means which are applied to the feed-rolls during a stitching operation to insure that the stitches are spaced evenly along the stitched seam.

Another object is to provide a machine of the type indicated with a rock-shaft actuated by the wire-stitching means to hold the feed-rolls connected to the intermittently operating driving means, move the feed-rolls toward each other to tightly grip the work, withdraw the gauge and apply the brake.

Another object is to provide a machine of the type indicated in which the rock-shaft is automatically latched in operative position during a stitching operation and released automatically upon completion of the stitching operation.

Another object is to provide a machine of the type indicated in which the operation of the wire-stitching means is initiated by the actuation of the gauge and the period of its operation governed by adjustable control means.

Another object is to provide a machine of the type indicated with means adjustable to square the folded sides of a carton-blank with the body portion thereof.

Still another object is to provide a machine of the type indicated which is of comparatively simple construction, substantially fool-proof in operation and adapted to stitch cartons at a high rate of speed.

Further objects of the invention are set forth in the following specification which describes a preferred form of construction of the machine, by way of example, as illustrated by the accompanying drawings. In the drawings:

Fig. 5 is a partial plan view of the machine showing the rock-shaft operated by the wire-stitching means for conditioning the feed-rolls for a stitching operation;

Fig. 6 is a transverse sectional view on line 6—6 of Fig. 1 showing a carton blank being fed by the feed-rolls toward the depending abutment of the gauge;

Fig. 7 is a sectional view on line 7—7 of Fig. 6 showing the stripper-block for stripping the work from the abutment-plate when the latter is withdrawn;

Fig. 8 is a fragmentary view similar to Fig. 6 showing the carton-blank engaged with the abutment-plate of the gauge and the sliding support actuated to close the switches of the electrical circuits for starting a stitching operation;

Fig. 9 is a view similar to Fig. 6 showing the relationship of the parts during a stitching operation and illustrating the rock-shaft operated to hold the clutch switch closed, withdraw the gauge from engagement with the work and move the spaced feed-rolls toward each other to tightly grip the work;

Fig. 10 is a view similar to Fig. 6 showing the stitched carton being discharged from the machine and the gauge resting on the tail end of the stitched carton in position to be engaged by a carton-blank being fed into the machine;

Fig. 11 is a sectional view on line 11—11 of Fig. 6 showing the switches adapted to be operated in timed sequence by the movement of the gauge;

Fig. 12 is a sectional view on line 12—12 of Fig. 8 showing both switches closed;

Fig. 13 is a sectional view on line 13—13 of Fig. 9 showing the clutch switch held closed by the rock-shaft to retain the feed-rolls connected to the intermittently operating driving means;

Fig. 16 is a view similar to Fig. 15 showing the rock-shaft actuated by the operation of the wire-stitching means to move the feed-rolls toward each other to tightly grip the work;

Fig. 17 is an end elevational view of the opposite end of the machine showing the brake for the feed-rolls and the arm on the rock-shaft for actuating the brake;

Fig. 18 is a detailed sectional view of one of the lower feed-rolls showing the means for clamping it to the drive-shaft or releasing it for rotation relative thereto;

Fig. 19 is a reduced plan view of a carton-blank shown as being fed into the machine and illustrating one abnormal relationship of the folded sides of the blank with respect to its body portion;

Fig. 20 is a reduced detailed side elevational view of the carton-blank illustrated in Fig. 19 showing the relationship of the cooperating feed-rolls;

Fig. 21 is a view similar to Fig. 19 showing the manner in which the folded sides of the carton-blank are squared with its body portion;

Fig. 22 is a view similar to Fig. 20 indicating the increment of rotation of the upper rolls relative to the lower rolls;

Fig. 23 is a view similar to Fig. 19 showing another abnormal relationship of the folded sides of the blank with respect to its body portion;

Fig. 24 is a view similar to Fig. 20 showing the relationship of the cooperating feed-rolls for feeding the blank;

Fig. 25 is a view similar to Fig. 21 showing the manner in which the folded sides of the carton-blank are squared with its body portion; and Fig. 26 is a view similar to Fig. 24 indicating the increment of rotation of the lower roll relative to the upper roll.

General organization

Figure 1:
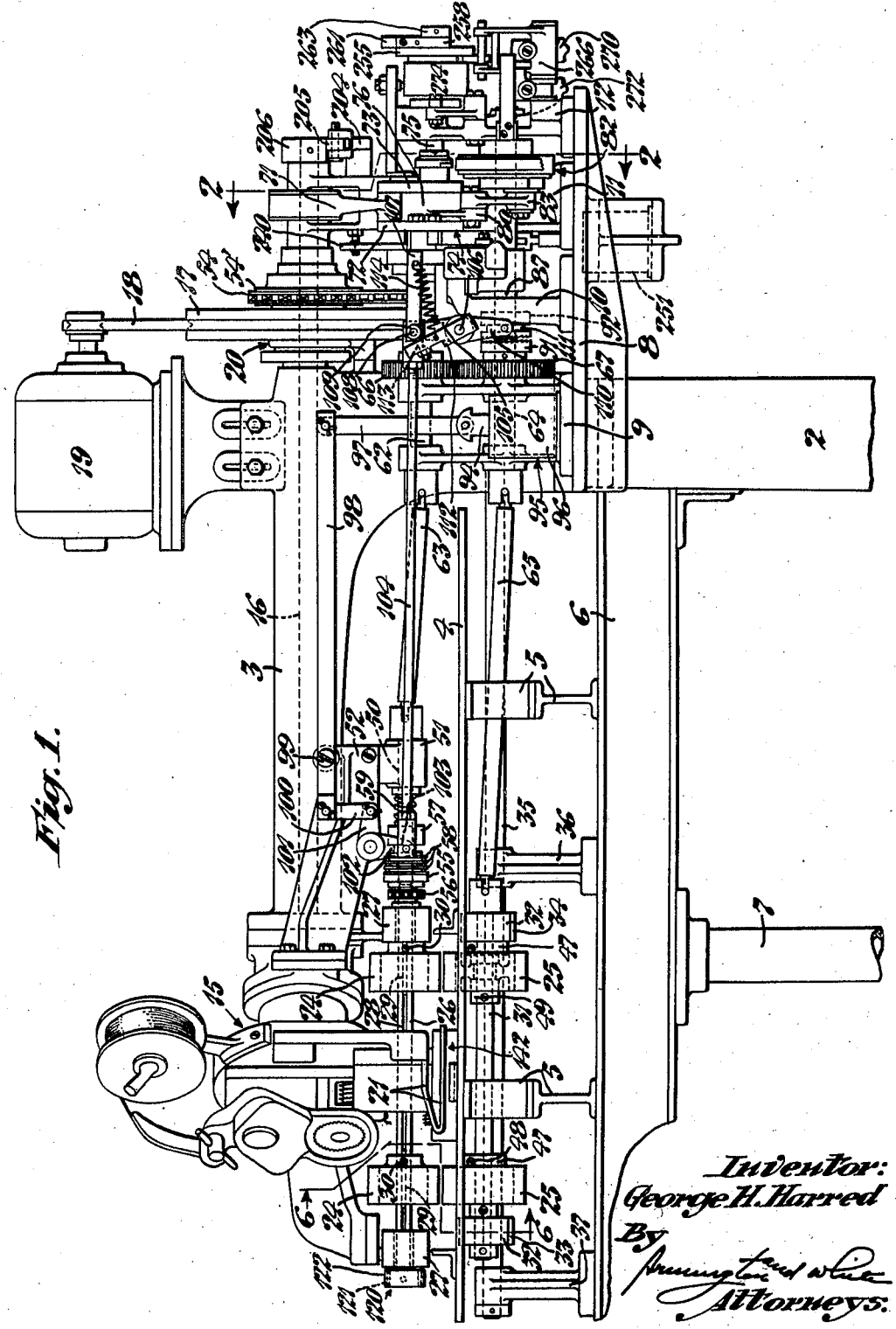
Fig. 1 is a front elevational view of a wire-stitching machine incorporating the novel features of the present invention.

In accordance with the present invention a prime-mover which may take the form of any suitable driving means operates continuously and, through appropriate connections, drives the opposed rolls for feeding the work. The feed-rolls when driven from the prime-mover advance a carton-blank into the machine and carry it against the depending abutment of a freely movable gauge which offers negligible resistance to the movement of the blank. The feed-rolls are normally spaced so as to grip the work lightly as it is fed into engagement with the depending abutment of the gauge to permit slippage between the carton-blank and the feed-rolls whereby to prevent jamming or scuffing of the carton-blank. The first movement of the gauge acts to operate a switch in an electric circuit to energize an electromagnet which, through suitable operating means, instantaneously actuates clutch-means to disconnect the feed-rolls from the continuously operating prime-mover and to connect them to an intermittently operating driving means driven from the wire-stitching means.

Upon operation of the clutch-means the speed of the work-feeding means is rapidly decelerated due to the inertia of the intermittently operating driving means. The work and work-gauge, however, continues to advance slightly due to momentum and just before the carton-blank comes to rest the gauge operates a second switch in a circuit which energizes an electromagnet connected to operate a second clutch-means for coupling the wire-stitching means to the prime-mover. The switch-operating means on the gauge are adjustable, one with respect to the other, to provide the proper time interval between the disconnection of the continuously operating driving means from the feed-rolls and the connection of the wire-stitching means with the prime-mover to cause the feeding of the work to be arrested before a wire-stitching operation is started whereby to properly position the work to be stitched.

A rock-shaft is actuated by the operation of the wire-stitching means and caused to act through an arm to engage the switch in the circuit for operating the first mentioned clutch-means and retain it closed to hold the work-feeding means connected to the intermittently operating driving means. Simultaneously therewith the rock-shaft operates through a crank-arm to withdraw the depending abutment of the gauge out of the path of movement of the carton-blank, a suitable stripper being provided to prevent the work from moving with the abutment when the latter is withdrawn. The rock-shaft also operates through suitable connecting means to move the lower feed-rolls toward the upper rolls to tightly grip the work therebetween and to apply a brake to the feed-rolls to prevent unwarranted movement thereof. A latch or detent-means operates automatically upon actuation of the rock-shaft by the wire-stitching means to hold it in rocked position during a stitching operation.

When connected to the prime-mover the wire-stitching means and the work-feeding means driven intermittently therefrom operate in timed relation to alternately apply stitches and advance the work to stitch the seam of the carton-blank. Operation of the wire-stitching means also acts to operate a control means with a step-by-step movement until a predetermined number of stitches have been applied, at which time the control means closes a switch to energize an electromagnet in circuit therewith. The last-named electromagnet is connected to operate stopping means for arresting the operation of the wire-stitching means and to simultaneously release the control means and the latch for holding the rock-shaft. Upon release of the rock-shaft a suitable spring operates to return it to initial position to release the switch in the circuit for the first-mentioned clutch-means. Suitable operating means then actuate the clutch-means to simultaneously disconnect the intermittently operating driving means from the feed-rolls and connect the continuously operating driving means thereto to discharge the stitched carton from the machine at a high rate of speed. The depending abutment of the gauge is released by the return movement of the rock-shaft and the gauge descends by gravity to ride on the tail end of the stitched carton-blank in position to be engaged by the forward edge of the next carton-blank to be stitched. The lower rolls of the work-feeding means also move into their normal spaced relationship to receive the next carton-blank to be stitched and feed it into engagement with the depending abutment of the gate. The brake for the feed-rolls also is released to permit the feed-rolls to rotate freely. Upon release of the control means for the wire-stitching means a clock-spring operates to return the same to initial position. At the end of the return movement of the control means an arm thereon actuates the switch to deenergize the circuit for the stopping means. The arms on the control means are relatively adjustable whereby to adapt them to actuate the switch in the stopping circuit after any predetermined number of stitches have been applied.

The present invention also provides for loosening the lower feed-rolls to square the forward edges of the folded side with the body portion of the blank to be stitched.

Wire-stitching means and drive therefor

The wire-stitching machine to which the improvements of the present invention are applied is generally similar to that illustrated and described in my copending application, Serial No. 392,928, referred to above. Suffice it to state herein that the machine comprises a main frame having a pedestal 2 with a horizontally projecting arm 3 at its upper end, see Fig. 1. Below the arm 3 is a work-table 4 supported by brackets 5 mounted on an I-beam 6 which projects laterally from the pedestal 2, the other end of the I beam being supported by a post 7. Projecting laterally from the pedestal 2 at the side opposite the table 4 is a platform or shelf 8. Mounted on the platform 8 are four bearing brackets 9, 10, 11 and 12 carrying bearings in which the rotating shafts of the machine are journaled, see Fig. 1. A wire-stitching head 15 is mounted at the end of the horizontally extending arm 3 for operation by a drive-shaft 16 extending through the arm and projecting beyond the pedestal 2 above the shelf 8. The wire-stitching head 15 may be of any suitable construction and, as herein illustrated, is of a type shown and described in United States Letters Patent No. 1,760,031, issued May 27, 1930, to H. G. Allen. In the operation of this type of wire-stitching head, during the first half revolution of the drive-shaft 16 a length of wire is cut from the supply, bent into a U-shaped staple, driven into the work and clinched on the under side thereof; and during the second half revolution of the drive-shaft 16 the parts of the stitching head are returned to initial position and another length of wire is fed into the head. A fly-wheel 17 is mounted for rotation on the projecting right-hand end of the drive-shaft 16, as viewed in Fig. 1, and continuously driven by a belt 18 from a suitable prime-mover, herein illustrated as an electric motor 19. A clutch 20 is provided adjacent the fly-wheel 17, see Figs. 1 and 4, for connecting the latter to the drive-shaft 16 for the wire-stitching head 15. Depending from the stitching head 15 is a combined flap guide and clinching anvil 21 of usual construction.

Work-feeding means and drive therefor

The work, usually in the form of a carton-blank W, shown in section in Fig. 6, is fed either continuously or intermittently in timed relation to the operation of the wire-stitching head 15 by means of spaced pairs of cooperating feed-rolls 24 and 25, see Fig. 1. The upper feed-rolls 24 are mounted on a shaft 26 journaled in suitable bearings 27 depending from the head 15 and arm 3. As shown in Fig. 1, the shaft 26 has a spline 28 extending throughout its length and a key 29 is provided for each feed-roll 24 for cooperation with the spline 28 to connect the feed-rolls for rotation with the shaft. The feed-rolls 24 are thus rendered adjustable toward and away from each other on the shaft 26 and may be fixed to the shaft in any adjustable position by means of set-screws 30 in the hubs of the rolls adapted to be tightened against the keys 29 to bind them to the shaft. As illustrated in Fig. 1, both ends of the shaft 26 project outwardly beyond the spaced bearings 27 depending from the stitching head.

The lower feed-rolls 25 are mounted on a shaft 31 journaled in yieldable bearings 32 at the ends of arms 33 and 34, see Figs. 5 and 6. The opposite ends of the arms 33 and 34 are pinned fast on a rock-shaft 35, see Figs. 5 and 15, which extends throughout the length of the machine and is journaled in the bearings carried by the bracket 11 on the shelf 8 and the brackets 36 and 37 supported on the I-beam 6, see Fig. 1. The arms 33 and 34 thus constitute a rockable cradle for supporting the lower feed-rolls 25. The rock-shaft 35 is rocked in counterclockwise direction, as viewed in Fig. 15, by means of a spring 38 connected to a crank-arm 39 depending from the rock-shaft and anchored to a stud 40 on the machine frame to normally maintain the lower feed-rolls 25 spaced from the upper feed-rolls 24 so as to cause them to take a relatively light grip on the work as it is fed into the machine or discharged therefrom. The rocking movement of the rock-shaft 35 by the spring 38 is limited by the engagement of an arm 44 depending from the rock-shaft with the end of an adjustable abutment 45. The adjustable abutment 45 is in the form of a screw rotatable in a tapped hole in the web of the bearing bracket 11 and provided with a handle 46 at one end for turning it to adjust the position of its end engaged by the depending arm 44 and thereby the relative position of the lower feed-rolls 25 with respect to the upper feed-rolls 24, see Fig. 15. Preferably, the screw 45 has longitudinally extending splines 42 in its sides for receiving a spring-pressed locking pin 43 to hold the screw from turning after its adjustment.

As shown in Fig. 18, each of the lower feed-rolls 25 is mounted fast on one end of a split sleeve 47 having a binding screw 48 for tightly clamping the sleeve to the shaft 31 for rotation therewith in certain instances. In other instances the feed-rolls 25 may be released to rotate on the shaft 31 for a purpose as later explained by loosening the screw 48. The lower feed-rolls 25 are retained in adjusted position on the shaft 31 by means of collars 49 which abut the ends of the sleeves 47.

The shaft 26 carrying the upper feed-rolls 24 is adapted to be driven by continuously operating driving means connected to the prime-mover 19. Connected to the inner end of the shaft 26 and axially alined therewith is a shaft 50, see Fig. 1, journaled in a bearing 51 depending from a bracket 52 attached to the arm 3 of the machine frame. The continuously operating driving means comprises a countershaft 53, see Fig. 4, driven from the fly-wheel 17 by means of a chain 54 and suitable sprockets 54'. The countershaft 53, in turn, drives a clutch-member 55 loosely mounted on the ends of the shafts 26 and 50 by means of a chain 56 and sprockets 56', see Figs. 1 and 17. A cooperating slidable clutch-member 57 is keyed to the shaft 50 and between it and the clutch-member 55 are a plurality of friction disks 58. The clutch-member 57 is yieldingly pressed toward the clutch-member 55 by means of a spring 59 to force the disks into frictional engagement. Thus, the rotation of the fly-wheel 17 will be transmitted through the chain 54, shaft 53, chain 56, clutch-member 55, disks 58 and clutch-member 57 to rotate the shafts 50 and 26 and feed-rolls 24. The rotation of the shaft 50 is also transmitted to a shaft 62 journaled in the bearing bracket 9 through a universally-jointed coupling rod 63, shown in Fig. 1. The shaft 31 mounting the lower feed-rolls 25 is connected to a shaft 64 journaled in bearings in the bracket 9 by means of a universally-jointed coupling rod 65. The shafts 62 and 64 carry intermeshing gears 66 and 67 whereby the rotation of the shaft 50 causes rotation of the shaft 31 to rotate the lower feed-rolls 25 in synchronism with the upper feed-rolls 24 whereof to advance the work W with a continuous movement.

Figures 2, 3:
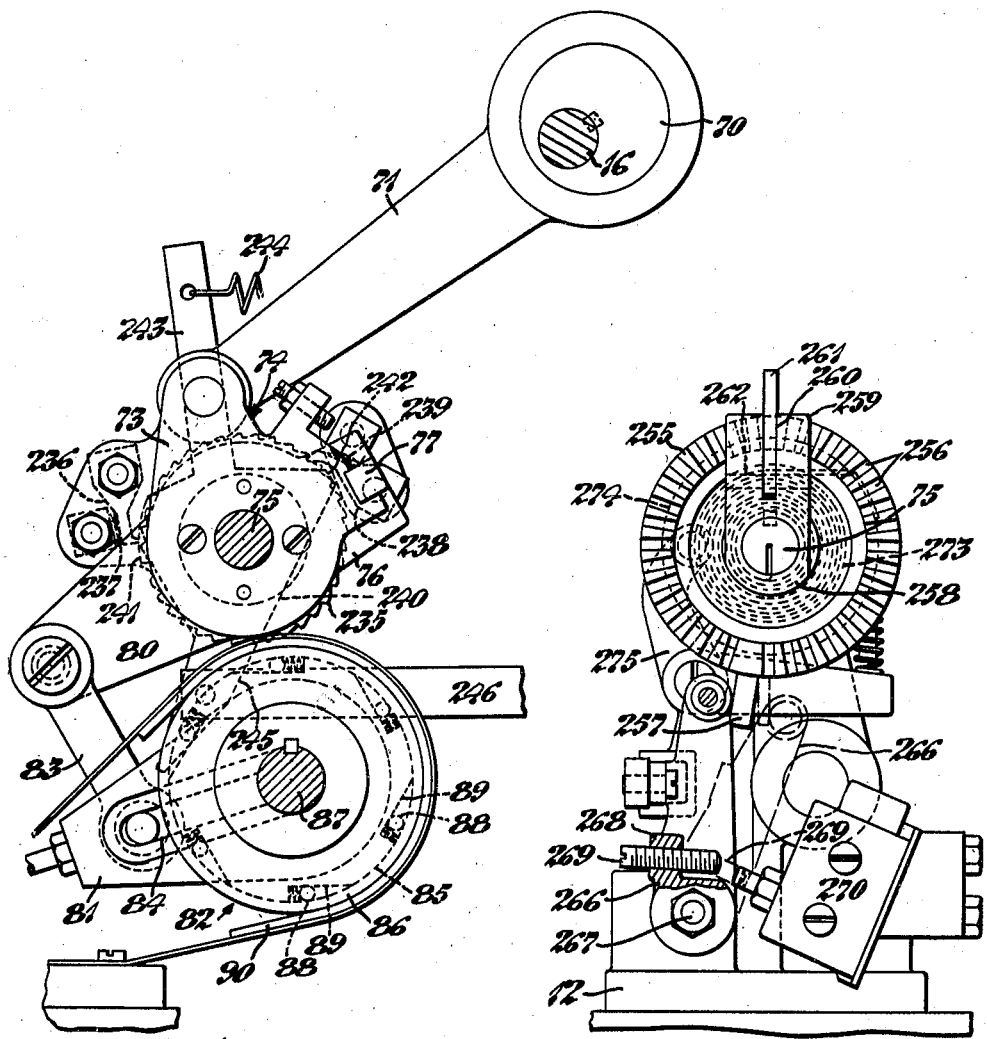
Fig. 2 is a transverse sectional view on line 2—2 of Fig. 1 showing the intermittently operating means for driving the feed-rolls and the control means for the wire-stitching means.
Fig. 3 is an end elevational view showing the manually adjustable control means for arresting the stitching operation after a predetermined number of stitches have been applied.

The shafts 26 and 31 are also adapted to be driven by intermittently operating means to step-feed the work during a stitching operation. The intermittently operating driving means receives motion from the drive-shaft 16 for the wire-stitching head 15 through connections comprising an eccentric 70 on the shaft 16 which actuates a pitman 71, see Figs. 1 and 2. The opposite end of the pitman 71 is pivotally connected to the spaced crank-arms 72 and 73 of an oscillated member 74 rockably mounted on a control shaft 75. A second oscillating member 76 mounted on the hub of the oscillating member 74 between the crank-arms 72 and 73 is adapted to be connected for movement therewith by a rockable key 77, see Fig. 2. The key 77 is adapted to be actuated by cams or the like on the control shaft 75, not herein shown, to cause the oscillating member 76 to be operated from the oscillating member 74 with a lost motion to produce a tie-stitch at the beginning and end of a row of stitches in the manner illustrated and described in detail in my prior application previously referred to. A crank-arm 80 projecting from the oscillating member 76 is connected to the crank-arm 81 of a one-way clutch 82 by means of a link 83. As illustrated in Fig. 2 the crank-arm 81 has a radial slot 84 which provides for adjusting its point of connection with the link 83 to vary its effective length and range of arcuate movement when driven by the crank-arm 80 whereby to vary the spacing between stitches.

The crank-arm 81 of the one-way clutch 82 is integral with a central hub-member 85 which is arranged to oscillate in a housing member 86 fast on a shaft 87. Rollers 88 in wedge-shaped recesses 89 in the oscillating hub 85 permit relative movement of the hub with respect to the housing 86 in counterclockwise direction as viewed in Fig. 2; the rollers being engaged frictionally with the rim of the housing 86 to connect the parts for movement as a unit when the hub is moved in clockwise direction. Preferably, a brake-band 90 is provided surrounding the housing 86 to prevent uncontrolled movement thereof.

The shaft 87 is journaled in the bearings of brackets 11 and 12 supported on the shelf or platform 8 and extends in axial alinement with the shaft 64, previously referred to. The shafts 64 and 87 are arranged to be connected by a clutch comprising a clutch-member 91 mounted fast on the end of the shaft 64 and a clutch-member 92 splined to the shaft 87 and movable axially thereof for cooperation with the clutch-member 91. When the clutch-member 92 is engaged with the clutch-member 91 the shaft 64 will be rotated from the shaft 87 and through the universally-jointed coupling rod 65 will rotate the shaft 31 mounting the lower feed-rolls 25. Rotation of the shaft 64 is also transmitted through the gears 67, 66, shaft 62, universally-jointed coupling rod 63, to the shaft 50 and through the clutch 55, 57 to the shaft 26 on which the upper pair of feed-rolls 24 are mounted. Thus, the upper and lower feed-rolls 24 and 25 may be rotated in synchronism from the intermittently operating driving means.

Figure 14:
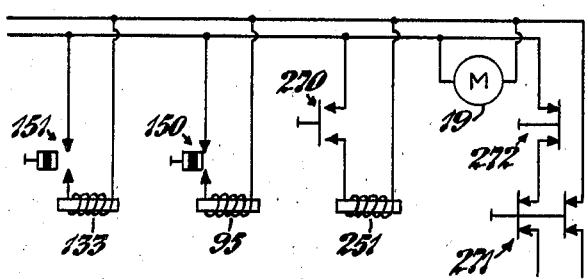
Fig. 14 (sheet 2) is a diagrammatic view of the electric circuits controlled by the switches.

The clutch-members 57 and 92 are arranged to be operated simultaneously by the armature 94 of an electromagnet 95 to disconnect the feed-rolls 24 and 25 from the continuously operating driving means and connect the feed-rolls to be driven from the intermittently operating driving means. Referring to Fig. 1, the electromagnet 95, see Fig. 14, is contained in a casing 96 on the foot of the bracket 9 and its armature 94 is connected by a link 97 to one end of a lever 98 pivotally mounted on a stud 99 projecting from the bearing bracket 52. The opposite end of the lever 98 is connected by a link 100 to one arm 101 of a shifting fork 102 in the form of a bell-crank lever. The shifting fork 102 straddles the clutch-member 57 and has pins and shoes engaging a peripheral groove 103 in the clutch-member.

A connecting rod 104 has a clevis at one end connected to one arm of the bell-crank shifting fork 102 and an adjustable clevis at its opposite end pivotally connected to the end of a lever 105 mounted to oscillate freely on a rock-shaft 106, see Fig. 1. The clevis connected to the lever 105 has a bar 107 attached to its side by a pin 108 extending through the bar, clevis and lever, with a bearing roller 109 rotatably mounted on the laterally extending end of the pin. A shifting fork 110 mounted fast on the rock-shaft 106 has pins and shoes which engage in a peripheral groove 111 in the clutch-member 92. The rock-shaft 106 also has a crank-arm 112 mounted fast thereon with an adjustable set-screw 113 adjacent its end for engagement with the roller 109. A spring 114 connects the bar 107 and the arm 112 for yieldingly holding the set-screw 113 on the arm in engagement with the roller 109. Upon energization of the electromagnet 95 the shifting fork 102 is actuated to slide the clutch-member 57 to the right, as viewed in Fig. 1, to release the friction clutch-disks 58 and thereby disconnect the continuously operating driving means from the feed-rolls 24 and 25. Rocking movement of the shifting fork 102 is transmitted through the connecting rod 104 and shifting fork 110 to engage the clutch-member 92 with the clutch-member 91 to cause the feed-rolls to be driven by the intermittently operating means. Upon deenergization of the electromagnet 95 the spring 59 on the shaft 50, acting between the bearing 51 and the clutch-member 57, will force the latter toward the clutch-member 55 to bind the friction disks 58 therebetween. Motion of the clutch-member 57 will be transmitted through the connecting rod 104 to move the roller 109 toward the left, as viewed in Fig. 1, to positively rock the arm 112, rock-shaft 106 and shifting fork 110 to disengage the clutch-member 92 from the clutch-member 91.

In accordance with the present invention a brake 120, see Fig. 1, is provided at the left-hand end of the shaft 26 on which the upper feed-rolls 24 are mounted, see also Figs. 5 and 17 in which the parts are viewed from the opposite direction. The brake 120 comprises a drum 121 on the end of the shaft 26 and a flexible brake-band 122 attached at one end to a stud 123 projecting from the bearing 27. The flexible brake-band is wrapped around the periphery of the drum 121 with its opposite end fastened to a reel 124 loosely mounted on a stud 125 projecting from the bearing bracket 27. An operating arm 126 attached at the side of the reel 124 is adapted to rotate the latter to tighten the brake-band 122 on the drum 121 in a manner later to be explained.

*Starting means*

A stitching operation may be started by connecting the fly-wheel 17 to the drive-shaft 16 for the wire-stitching head 15 by means of the clutch 20. The clutch 20 is of substantially the same construction as that illustrated and described in United States Letters Patent No. 1,495,342, issued May 27, 1924, to A. H. Maynard. Suffice it to state herein that the clutch is normally held inoperative or disconnected by a stop-pin 129, see Fig. 4, projected into an opening in the clutch by means of a spring 130 and is operative to couple the fly-wheel 17 to the shaft 16 when the pin is withdrawn against the action of the spring. The pin 129 is withdrawn by means of a double bell-crank lever 131 having one arm projecting into a peripheral groove 132 in the pin and another arm projecting at right-angles thereto. The bell-crank lever 131 is arranged to be actuated by an electromagnet 133 having its armature 134 connected thereto by a link 135. When the electromagnet 133 is energized its armature 134 operates through the link 135 and bell-crank lever 131 to withdraw the pin 129 against the action of the spring 130 to couple the fly-wheel 17 to the drive-shaft 16.

Figure 4:
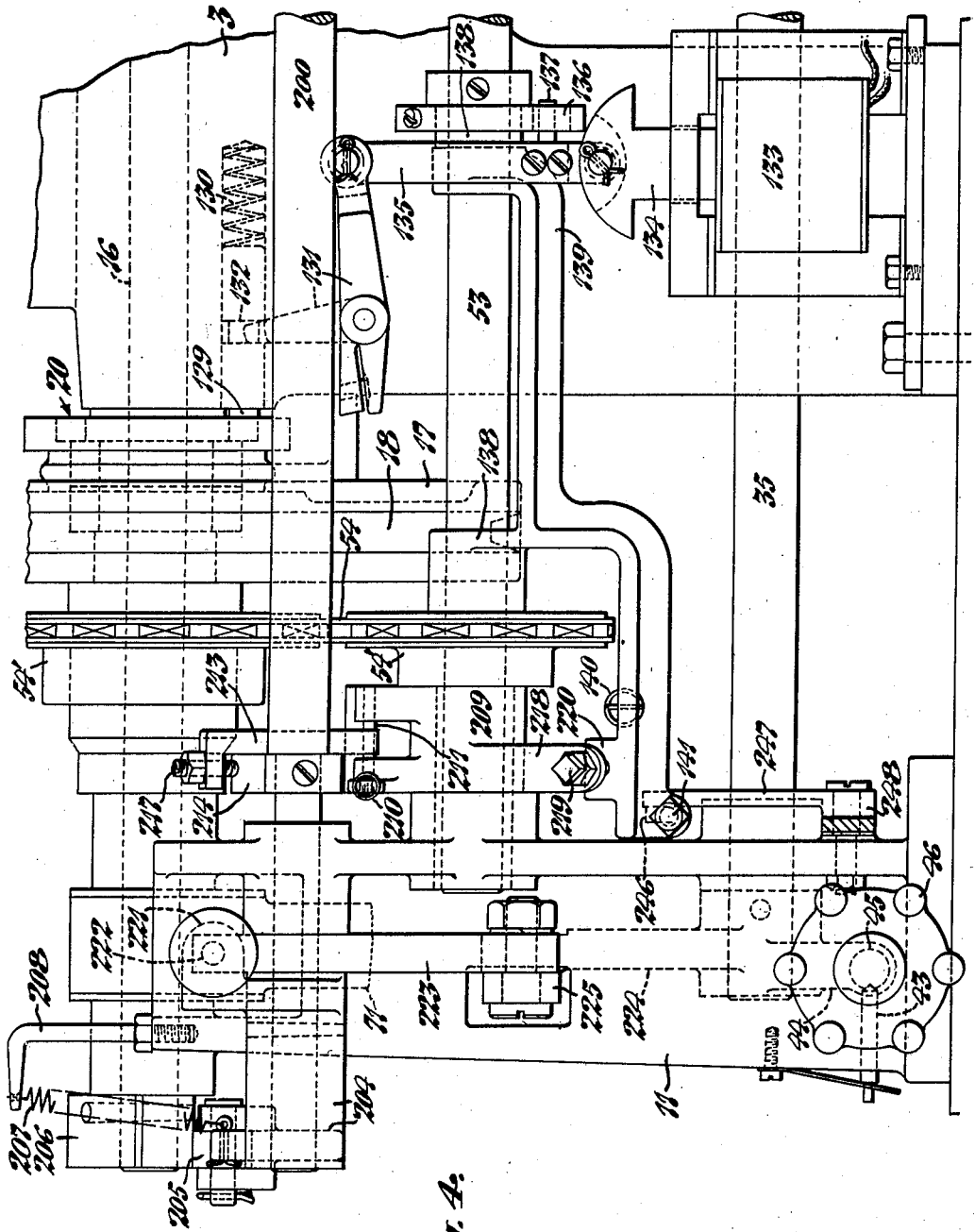
Fig. 4 is a rear elevational view showing the means for starting and stopping the wire-stitching operation.
Figure 15:
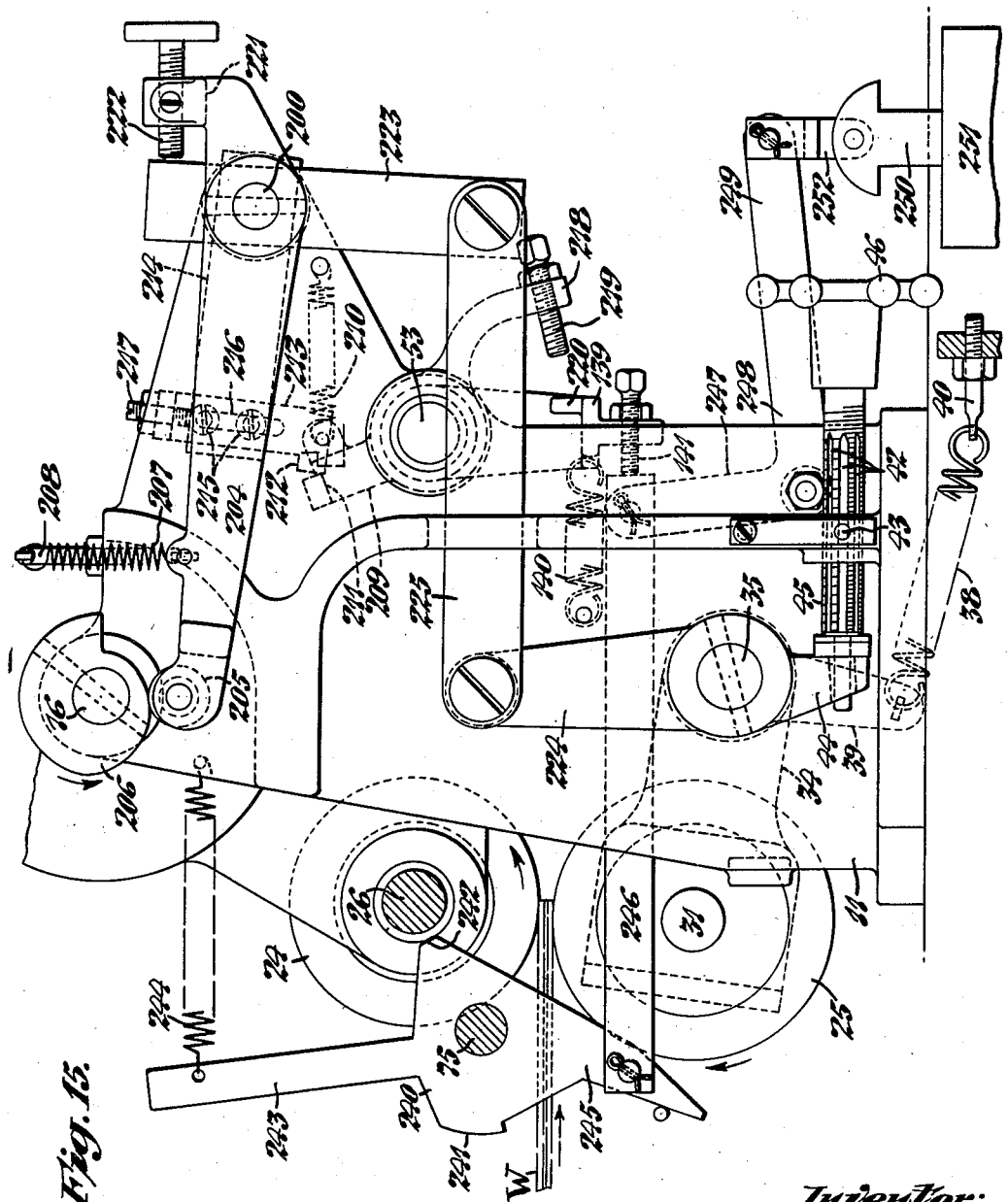
Fig. 15 is an end elevational view showing the spaced relationship of the feed-rolls prior to the operation of the wire-stitching means.

A latching element 136 operates automatically to engage a pin 137 carried by the link 135 to retain the clutch-control pin 130 retracted during a stitching operation. As shown in Fig. 4, the latch-element 136 is clamped to a rockable frame 139 having hubs 138 loosely mounted on the shaft 53 of the continuously operating means for driving the feed-rolls 24 and 25. A helical spring 140, see Fig. 15, is connected to the frame 139 for rocking it and the latch-member 136 mounted thereon to engage the latter with the pin 137 on the link 135 after the electromagnet 133 is energized. The frame 139 has an adjustable abutment in the form of a set-screw 141 for engagement by stopping means, later to be described, for rocking the frame and latch-member 136 to release the pin 137 whereby the spring 130 will project the pin 129 into the clutch 20, see Fig. 4, to arrest a stitching operation.

*Work-operated gauge*

The energization of the electromagnets 95 and 133 is controlled by a work-operated gauge 142 shown in detail in Figs. 5 to 13. The work-operated gauge 142 is generally similar to the gauge illustrated and described in my copending application referred to above. Suffice it to state herein that the gauge 142 comprises an upper horizontal plate 143 supported from a vertical plate 14 depending from the side of the wire-stitching head 15 and an arm 144 attached to the plate 14, see Fig. 6. Slidably mounted on the under side of the horizontal plate 143 is a plate 145 having studs 146 at either end projecting through elongated slots in the stationary plate with washers 148 overlying the top face of the latter under the heads of the studs, the above described construction being set forth more fully in my application referred to hereinbefore.

Surmounting the stationary plate 143 is a switch-block 149 embodying two separate switches 150 and 151, see Fig. 11. The switches 150 and 151 may be of any suitable type and, as herein illustrated, each switch comprises a pair of spaced contacts 152 and 153 adapted to be bridged by a metallic ring 154 carried by a plunger 155. A spring 156 acting between the block 149 and the plunger 155 of each switch 150 or 151 tends to move the latter to disengage the metallic bridge-element 154 from the spaced contacts 152 and 153.

The operator for the switches 150 and 151 comprises a post 160 having its base mounted on the upper ends of studs 161 secured in the sliding plate 145 and projecting upwardly through elongated slots in the stationary plate 143. The post 160 carries adjustable abutments in the form of screws 162 and 163 adapted to engage the ends of the plungers 155 of the switches 150 and 151. The abutment 162 is shown as adjusted to a position forwardly of the abutment 163 to adapt it to engage and operate the plunger 155 of the switch 150 prior to the engagement of the abutment 163 with the plunger of the switch 151.

By reference to the electrical circuit indicated diagrammatically in Fig. 14 it will be noted that the switch 150 controls the energization of the electromagnet 95 for operating the clutch-members 57 and 92 to uncoupled the continuously operating driving means for the work-feeding means and couple the intermittently operating driving means thereto. The switch 151 controls the energization of the electromagnet 133 for withdrawing the pin 129 from the clutch 20, see Fig. 4, to couple the fly-wheel 17 to the drive-shaft 16. It will be observed by reference to Fig. 6 that the slidable plate 145 of the gauge 142 is yieldingly urged toward the right by means of a relatively light spring 164 which offers little resistance to movement in the opposite direction. As thus far described the work-operated gauge is substantially identical with that illustrated and described in my prior application referred to above.

In accordance with the present invention an intermediate operating member 165 for the switch 150 is provided between the abutment 162 and the plunger 155, being arranged for operation by the gauge 142 to close the switch and to be engaged thereafter by operating means described hereinafter, to hold the switch closed independently of the gauge. The intermediate member 165 is in the form of a lever pivotally mounted between its ends on a stud 166 carried by a bracket 167 fastened to the side of the switch-block 149. The lever 165 is arranged to rock in counterclockwise direction, as viewed in Fig. 6, under the action of a helical spring 168 connected between the member and a stud 169 on the arm 144. Projecting laterally from the upper end of the intermediate member or lever 165 is an arm 170 having its upper edge beveled to provide a cam-face 171.

As shown in Figs. 5 and 6 the gauge 142 is provided with a novel form of work-operated abutment which is movable substantially vertically into position to be engaged by the forward end of a carton-blank W fed thereagainst by the feed-rolls 24 and 25. The abutment 174 is in the form of a plate depending from a frame 175 comprising spaced parallel arms 176 and 177, see Fig. 5, and is of suitable dimensions to adapt it to engage the forward edges of the folded sides and body-portion of practically any type of carton-blank. The abutment 174 is mounted for adjustment on the frame 175 by means of brackets 178 slidable along the arms 176 and 177. The brackets 178 comprise flat plates 179 to which the abutment 174 is attached by means of screws 180, see Fig. 7, and arms which extend rearwardly and upwardly from the abutment, the ends of the arms being bifurcated to embrace the sides of the arms 176 and 177 of the frame 175. A top plate 181 is attached to the bifurcated ends of each bracket 178 by means of a screw 182, see Fig. 7, to overlie the top of the arm 176 or 177 of the frame 175 to support the brackets thereon. The brackets 178 thus are adapted to be slid along the arms 176 and 177 of the frame 175 and locked in any adjusted position by means of set-screws 183 in the arms engaging intermediate blocks 184 to clamp them against the side of the arms.

The rearward end of the frame 175 is hingedly mounted on the sliding plate 145 of the gauge 142 by means of a pivot-pin 185 which extends through the ends of the arms 176 and 177 and spaced ears 186 depending from the plate. It will be noted by reference to Fig. 7 that the arms 176 and 177 of the frame 175 are spaced apart a distance greater than the width of the plates 143 and 145 of the gauge so that the frame is free to rock on the pivot-pin 185. Due to the considerable length of the frame 175 the rocking movement about its pivot-pin 185 will cause the abutment-plate 174 to move in a substantially vertical plane.

When a carton-blank W is fed forwardly by the feed-rolls 24 and 25 to engage its end against the abutment 174 the latter will act through the frame 175 to slide the plate 145 and thereby close the switches 150 and 151 in timed sequence. After the switches have been closed to initiate the operation of the wire-stitching head 15 the abutment plate 174 is withdrawn vertically to permit the work to pass thereunder. To prevent the forward end of the carton blank W from rising vertically with the abutment 174 a stripper 187 is provided for cooperation with the abutment, see Figs. 6 and 7. The stripper 187 is in the form of an angular block having an inclined guide 188 projecting from its forward end for directing the forward edge of the carton-blank downwardly to insure its engagement with the abutment-plate 174. The top face of the stripper-block 187 is provided with a guideway 189 which embraces the sides of a bracket 190 attached to the under side of the sliding plate 145 of the gauge to adapt the stripper to slide therealong, see Figs. 6 and 7. Intermediate its ends the stripper 187 has a slot 191 for receiving the abutment-plate 174 as it is raised out of the path of movement of the carton-blank W. The slot 191 of the stripper 187 is of a depth slightly greater than the height of the abutment-plate 174 so that the bottom of the stripper will hold the carton-blank W while the abutment-plate is being raised into the slot. The upper edge of the abutment-plate 174, however, is always positioned within the slot 90 in the stripper-block 187 so that the latter will be moved with the abutment-plate during its adjustment along the frame 175.

The frame 175 is adapted to be rocked on its pivot 185 from the position shown in Fig. 6 to that shown in Fig. 9 by means of a rockable arm 194 which is fast on a rock-shaft 200 and actuated in a manner to be described later. The arm 194 is bifurcated at its end, see Fig. 5, to adapt it to straddle the upper end of a link 195 and the link, in turn, is forked at its lower end to position its ends adjacent the spaced arms 176 and 177 of the frame 175. A pin 196 extending between the bifurcations of the arm 194 and through an elongated slot 197 in the link 195 connects the arm and link and the lower forked end of the link is connected to the arms 176 and 177 of the frame 175 by means of bolts 198. A spring 199 is connected between the arm 194 and arm 176 of the frame 175 to counterbalance the weight of the frame to cause the abutment 174 to normally engage the upper side of the table 4 on which the work is supported.

*Control means for the work-feeding means*

As explained above, the gauge 142 is operated by the movement of the carton-blank W to be stitched to effect the disconnection of the continuously operating driving means from the work-feed rolls 24 and 25 and the connection of the feed-rolls to be driven by the intermittently operating means and to initiate the operation of the wire-stitching head 15. In accordance with the present invention, operation of the wire-stitching head 15 actuates the rock-shaft 200, Figs. 5, 6 and 15, for conditioning the feed-rolls 24 and 25 for a stitching operation; taking over the control of the switch 150 to maintain the feed-rolls connected to the intermittently operating driving means and withdrawing the abutment 174 of the gauge 142 from the path of movement of the carton-blank to be stitched. Referring to Fig. 5, the rock-shaft 200 extends throughout substantially the whole length of the machine at the rearward side thereof and is journaled at one end in a bearing on the bracket 12 supported from the platform 8 and at its opposite end is spaced bearings 203 which depend from the wire-stitching head 15. A crank-arm 204 pinned to the left-hand end of the rock-shaft 200 as viewed in Fig. 5, extends forwardly and has a follower-roller 205 mounted between bifurcations at its end underlying the drive-shaft 16 for the wire-stitching head 15, see Figs. 4 and 5. As shown in Figs. 1 and 15 a spiral cam 206 is pinned to the right-hand end of the drive-shaft 16, as viewed in Fig. 1, and arranged to cooperate with the follower-roller 205 on the crank-arm 204. The follower-roller 205 is yieldingly held in engagement with the spiral cam 206 by a spring 207 connected at one end to the crank-arm with its opposite end anchored to a stud 208 on the bearing bracket 12. The spiral cam 206 is so shaped in profile that during the first 90° of rotation of the drive-shaft 16 the crank arm 204 will be rocked from the position illustrated in Fig. 15 to that illustrated in Fig. 16 to turn the rock-shaft 200.

Upon turning of the rock-shaft 200 a latch-member 209 mounted on the shaft 53 of the continuously operating driving means is rocked by a spring 210 anchored to the bracket 11, see Figs. 15 and 16, to engage its detent-shoulder 211 with the shoulder 212 of a latch-member 213 carried by an arm 214 pinned fast to the rock-shaft 200, see Fig. 5. The latch-member 213 is attached to the side of the arm 214 by means of screws 215, see Fig. 15, extending through a slot 216 in the latch. The latch 213 thus may be adjusted on the arm 214 by loosening the screws 215 and turning a set-screw 217 to raise or lower the detent-shoulder 212 with respect to the detent-shoulder 211 of the latch-member 209. Thus the latch-member 209 is operated automatically by the spring 210 to latch the crank-arm 204 in the rocked position to which it is operated by the spiral cam 206. The latch-member 209 is provided with a depending arm 218 having an adjustable abutment 219 in the form of a set-screw which overlies a flange 220 on the rockable frame 139, previously referred to in the description of the starting means.

The crank-arm 204 has an offset lug 221 at the opposite side of the rock-shaft 200 from the follower-roller 205 which mounts an adjustable abutment 222 in the form of a set-screw. Adjacent the hub of the crank-arm 204 is a lever 223 mounted for rocking movement on the rock-shaft 200. Upon turning movement of the rock-shaft 200 in counterclockwise direction, as viewed in Fig. 15, the adjustable abutment 222 will engage the upper end of the lever 223 and rock it from the position shown in Fig. 15 to that shown in Fig. 16. The opposite end of the lever 223 is connected to the end of a crank-arm 224 on the shaft 35 by means of a link 225. The crank-arm 224 is fast on the shaft 35 which carries the arms 34 of the cradle for mounting the lower pair of feed-rolls 25 so that the initial rotation of the drive-shaft 16 for the stitching head 15 operates through the connecting linkage above described to move the lower pair of feed-rolls 25 toward the upper pair of feed-rolls 24 to grip the work firmly therebetween.

Immediately upon turning of the rock-shaft 200 by the drive-shaft 16 for the wire-stitching head 15 an arm 228 pinned to the rock-shaft is moved from the position shown in Fig. 6 to that shown in Fig. 9. The free end of the arm 228 is beveled as indicated by the reference character 229 to adapt it to engage the cam-face 171 at the upper end of the lever 165. Thus, the arm 228 will act to hold the lever 165 in position to retain the switch 150 closed. Consequently, the electromagnet 95 controlled by the switch 150 will be maintained energized to hold the intermittently operating means connected to drive the feed-rolls 24 and 25. In other words, the rock-shaft 200 will take over the control of the switch 150 immediately upon operation of the wire-stitching head 15 to permit the abutment-plate 174 of the gauge 172 to be withdrawn from the path of movement of the carton-blank W being operated upon.

The crank-arm 194, previously referred to, is also mounted fast on the shaft 200, see Figs. 5 and 9, and adapted to be operated by the initial rotation of the drive-shaft 16 for the stitching head 15 to raise the abutment 174 of the gauge 142. It will be noted by reference to Fig. 6, however, that the pin 196 is movable in the slot 197 in the link 195 to delay the raising of the abutment-plate 174 until the arm 228 has been moved into engagement with the lever 165 to retain the switch 150 in its closed position. When the abutment-plate 174 is withdrawn from the path of movement of the carton-blank W the frame 175 and plate 174 of the gauge 172 will be released and moved to the right by the spring 164 to shift it from the position shown in Fig. 8 to that shown in Fig. 9 whereby to release the plungers 155 of the switches 150 and 151; the plunger 155 of the switch 150 thereafter being held by the lever 165 and arm 228 to maintain the switch closed.

The rock-shaft 200 also operates to tighten the brake-band 122 on the brake-drum 121 at the end of the shaft 26 mounting the upper feed-rolls 24. As shown in Figs. 5 and 17, an arm 230 fast on the rock-shaft 209 projects forwardly therefrom to overlie the actuating arm 126 of the brake-applying means. An adjustable abutment 231 in the form of a set-screw is engageable with the free end of the actuating arm 126 to move the latter from the position shown in full lines to that indicated by dash-lines in Fig. 17 when the rock-shaft 209 is turned by the cam 206 during the initial operation of the wire-stitching head 15. Actuation of the arm 126 will rotate the reel 124 to wind the brake-band 122 thereon and tighten it about the drum 121 on the shaft 26. The friction applied to the drum 121 by the brake-band 122 holds the shaft 26 from moving freely so that the feed-rolls 24 will accurately space the stitches along the seam of the carton W. From the foregoing description it will be observed that the rock-shaft 209 is turned during the initial operation of the stitching head 15 and operates to move the feed-rolls 24 and 25 toward each other, hold the feed-rolls connected to the intermittently operating means to be driven thereby, withdraw the gauge from the path of movement of the work and apply the brake to the feed-rolls. It also will be observed that the rock-shaft 209 is arranged to be latched to retain it operative during a stitching operation.

*Control means for the wire-stitching means*

The stopping of the stitching operation is governed by the control shaft 75, previously referred to, which is operated in timed relation to the wire-stitching means. The control shaft 75 is journaled in bearings on the brackets 11 and 12 supported from the platform 8 of the machine frame, see Fig. 1. Mounted on the inner end of the control shaft 75 is a ratchet-wheel 235, see Fig. 2, positioned closely adjacent the crank-arm 72 of the oscillating member 74. Mounted on the side of the crank-arm 72 of the oscillating member 74 is a pawl 236 which overlies the teeth of the ratchet-wheel 235 and is yieldingly engaged therewith by means of a spring 237. A check-pawl 238 rockably mounted on the bracket 11 is engaged with the teeth of the ratchet-wheel 235 by a spring 239 to hold the ratchet-wheel 235 between strokes of the pawl 236. As the crank-arm 72 of the oscillating member 74 is reciprocated by the eccentric 70 and pitman 71 the pawl 236 acts to index the ratchet-wheel 235 in counterclockwise direction, as viewed in Fig. 2, through a distance of one tooth.

Rockably mounted on the control shaft 75 adjacent the ratchet-wheel 235 is a release plate 240, indicated by dotted lines in Fig. 2, having cam-lobes 241 and 242 engageable with the pawls 236 and 238 for releasing them from engagement with the teeth on the ratchet-wheel 235. The lobe 241 of the release plate 240 also acts as a support on which the pawl 236 slides during part of its operative stroke to limit the advancement of the ratchet-wheel to one tooth only for each stitch applied. The release plate 240 is formed with an arm 243 projecting upwardly and connected to a spring 244 anchored to the bracket 11, see Fig. 15, which acts to rock the release plate in clockwise direction, as viewed in Fig. 2, to disengage the lobes 241 and 242 from the pawls 236 and 238. The release plate 240 is also formed with a depending arm 245 connected to one end of a horizontal link 246. The opposite end of the link 246 is connected to the upright arm 247 of a bell-crank lever 248, shown in Fig. 15, and the rearward end of the link constitutes a bunter for engaging the adjustable abutment 141 on the rockable frame 139. The opposite horizontal arm 249 of the bell-crank lever 248 is connected to the plunger-armature 250 of an electromagnet 251 by means of a link 252. Energization of the electromagnet 251 will cause it to rock the bell-crank lever 248 to slide the link 246 and rock the frame 139 from the full line position to the dash-line position illustrated in Fig. 16. This action will release the latching element 136 from engagement with the pin 137 on the link 135, see Fig. 4, whereby the spring 130 will project the plunger 129 into the clutch 20 to uncouple the fly-wheel 17 from the drive-shaft 16. The frame 139, in turn, will rock the latch-member 209 to release the rock-shaft 200. Simultaneously, the link 246 will rock the release plate 240 to disengage the pawls 236 and 238 from the teeth on the ratchet-wheel 235. Thus the link 246 and rockable frame 139 constitute a stopping means for arresting the stitching operation.

Keyed to the outer end of the control shaft 75 is a dial 255, see Figs. 1 and 3, having an offset rim provided with a series of radial slots 256, there being a slot corresponding to each tooth of the ratchet-wheel 235 whereby the rotation of the control shaft 75 a distance of one tooth by the oscillating member 74 will rotate the disk 255 an angular distance corresponding to one slot on the dial. As the present machine is adapted to apply any number of stitches from one to thirty-six, there are thirty-five radial slots 256 in the dial 255 with the slots indicated by suitable indicia. The dial 255 also has an arm 257 projecting radially beyond the periphery of the disk 255 between the first and thirty-fifth slots 256. Freely mounted for rotation on the outer end of the control shaft 75 is a hub 258 having a radially extending flange 259 with a centrally disposed radial slot 260. An arm 261 positioned in the slot 260 is pivotally mounted for rocking movement on a pin 262 extending across the slot. The arm 261 is adapted to be rocked on the pin 262 into engagement with any one of the radial slots 256 in the dial 255 and is of such length as to adapt its end to project radially beyond the periphery of the dial. The arm 261 is retained in the appropriate slot 256 into which it has been inserted manually by any suitable detent-means and the hub 258 is retained axially in position on the shaft 75 by means of a collar 263 pinned to the outer end of the shaft, see Fig. 1. The ends of the arms 257 and 261 are adapted to engage and actuate a switch-operating frame or lever 266 rockably mounted on a stud 267. Lever 266 is so mounted on its pivot 267 as to offer frictional resistance to movement whereby it will remain in the position to which it is rocked. Mounted in a boss 268 on the lever 266 is an adjustable abutment 269 herein illustrated in the form of a set-screw.

Adjacent the rockable lever 266 is an electric switch 270 located in position to be engaged by the abutment 269 on the lever 266. The switch 270 may be of any suitable construction but, as herein illustrated, is of the push-button type and mounted on a suitable bracket projecting from the bracket 12 supported from the platform 8. As indicated in Fig. 14, the switch 270 is in circuit with the electromagnet 251 and adapted to close the circuit when engaged by the abutment 269 on the lever 266 and open the circuit when the arm is moved away from the switch. It will be observed by reference to Fig. 14 that the motor 19 is connected across the power line and that the power line is controlled by a main switch 271 and an auxiliary safety switch 272 as described in detail in my prior application referred to above.

Upon energization of the electromagnet 251 and release of the control shaft 75 by the disengagement of the pawls 236 and 238 from the ratchet-wheel 235 a clock-spring 273, see Fig. 3, will operate on the control shaft to return it to initial position. The clock-spring 273 is enclosed within the housing 274 and tensioned between it and the control shaft 75, see Figs. 1 and 3. Upon return rotation of the control shaft 75 under the operation of the spring 273 the projecting end of the arm 257, moving in clockwise direction as viewed in Fig. 3 will engage the end of the rockable lever 266 to rock it to the position illustrated in full lines in Fig. 3 whereby to release the switch 270 and open the circuit to the electromagnet 251. To limit the return movement of the control shaft 75 and prevent its rebound from intial position, a spring-pressed detent-lever 275 cooperates with a suitable detent on the control shaft, not herein shown, in the manner illustrated and described in my prior application referred to above. A preferred embodiment of the invention having been described in detail the mode of operation of the complete machine is explained as follows:

*Mode of operation*

At the beginning of a stitching operation the motor 19, energized by the manual closing of the switch 271 in the power line, see Fig. 14, will drive the fly-wheel 17 by means of the belt 18 and through the chain 54 rotate the shaft 53, see Fig. 4. The clutch member 57 being pressed by the spring 59 toward the left, as viewed in Fig. 1, to frictionally engage the clutch-disks 58 and the clutch-member 92 being disengaged from the clutch-member 91, the shaft 53 will drive the shafts 50 and 26 through the chain 56. Consequently, the work feed-rolls 24 mounted on the shaft 26 will be rotated at high speed and the shaft 50 driving through the universal coupling 63, shaft 62, gears 66, 67, shaft 64 and universal coupling 65 will drive the shaft 31 carrying the lower pair of feed-rolls 25 whereby the upper and lower feed-rolls are rotated in synchronism.

To start the stitching operation a carton-blank W is inserted between the pairs of normally spaced feed-rolls 24 and 25 and is advanced thereby to engage its end with the depending abutment 174 of the work-operated gauge 142, see Figs. 6 and 8. Upon engagement of the end of the carton-blank W with the abutment 174 the plate 145 of the gauge 142 will be slid with respect to the fixed plate 143, thereby causing the abutment 162 carried by the post 160 to engage the pivoted lever 165 and rock it from the position shown in Fig. 6 to that shown in Fig. 8. Rocking movement of the lever 165, in turn, will operate the plunger 155 of the switch 150 to close the circuit to the electromagnet 95, see Figs. 12 and 14. Energization of the electromagnet 95 will cause its armature 94 to act through the link 97, lever 98, link 100 and shifting fork 102, see Fig. 1, to slide the clutch-member 57 against the action of the spring 59 to release the clutch-disks 58. Operation of the shifting fork 102 will act through the connecting rod 104, bar 107 and spring 114 to cause the arm 112, shaft 106 and shifting fork 110 to rock to yieldingly engage the clutch-member 92 to the clutch-member 91. Thus, the feed-rolls 24 and 25 will be disconnected from the continuously operating driving means and connected to the intermittently operating driving means to cause rapid deceleration in the speed of the feed-rolls due to the engagement of the brake-band 90 with the clutch-housing 86.

Before the feed-rolls 24 and 25 come to rest, however, the slide 145 of the work-operated gauge 142 will have been moved to close the switch 151 as shown in Fig. 12 to thereby energize the electromagnet 133, see Fig. 4. Energization of the electromagnet 133 will cause its armature 134 to operate through the link 135 and bell-crank lever 131 to withdraw the pin 129 from the clutch 20 against the action of the spring 130. The pin 129 then will be latched in retracted position by the latching member 136 on the rockable frame 139 engaging with the pin 137 on the link 135. Withdrawal of the pin 130 will cause the clutch 20 to couple the fly-wheel 17 to the drive-shaft 16 for operating the stitching head 15.

During the first 90° of rotation of the drive-shaft 16 for the wire-stitching head 15 the cam 206 at the end of the shaft, see Fig. 1, will rock the crank-arm 204 and rock-shaft 200 to which it is pinned from the position shown in Fig. 15 to that shown in Fig. 16 where it is latched by the engagement of the detent-shoulder 211 of the rockable latch-member 209 with the detent-shoulder 212 of the member 213 on the arm 214. During the rocking movement of the crank-arm 204 the set-screw abutment 222 will rock the lever 223 and through the link 225 and crank-arm 224 will rock the shaft 35. Rocking movement of the shaft 35 carrying the arms 33 and 34 of the cradle supporting the lower pair of feed-rolls 25 will move them toward the upper pair of feed-rolls 24 to grip the carton W firmly therebetween, see Fig. 16. Rocking movement of the rockshaft 200 also will cause the arm 228 mounted thereon, see Fig. 6, to engage its beveled end 229 with the beveled camface 171 of the lever 165 to hold the latter against the plunger 155 of the switch 150 in the position shown in Fig. 9. The switch 150 thus will be closed and held by the arm 228 and lever 165 to maintain the electromagnet 95 energized and thereby maintain the intermittently operating means connected to drive the feed-rolls 24 and 25. Simultaneously with the engagement of the arm 228 with the lever 165 the arm 194 will be rocked from the position shown in Fig. 6 to that shown in Fig. 9. The pin 196 carried by the arm 194 will therefore raise the link 195 and frame 175 connected thereto to withdraw the abutment-plate 174 from the path of movement of the carton-blank W. It is to be noted that the elongated slot 197 in the link 195 will permit rocking movement of the arm 228 to engage the lever 165 for closing the switch 150 before the link 195 is raised to withdraw the abutment-plate 174. During the withdrawal of the abutment-plate 174 the bottom face of the stripper-block 187 engages the work to prevent it from moving upwardly with the abutment as the latter moves into the slot 191.

Rocking movement of the rock-shaft 200 also will rock the crank-arm 230, see Figs. 5 and 17, and by means of the set-screw abutment 231 at its end will actuate the arm 126 to rotate the reel 124. Rotation of the reel 124 will tighten the brake-band 122 on the drum 121 at the end of the shaft 26 carrying the feed-rolls 24.

Thus the brake-band 122 will apply frictional resistance to the rotation of the shaft 26 to control the rotation of the feed-rolls as they feed the carton-blank W through predetermined increments of movement between stitches as controlled by the intermittently operating driving means. As a result, a more accurate spacing of the stitches along the seam may be obtained as the brake eliminates back-lash due to wear of the parts. The feed-rolls 24 and 25 thus are automatically controlled to grip the work firmly and the abutment-plate 174 of the gauge 142 is withdrawn to condition the machine for a stitching operation.

During the first half revolution of the drive-shaft 16 the stitching head 15 will be operated to apply the first stitch to the work W and the eccentric 70 will drive the pitman 71 through its forward stroke, see Figs. 1 and 2. Operation of the pitman 71 through a forward stroke will actuate the oscillating members 74 and 76 through a forward stroke, and the latter operating through the crankarm 80 and link 83, see Fig. 2, will operate the one-way clutch 82 through an idle stroke. During the forward stroke of the oscillating member 74 the pawl 236 will ride on the lobe 241 of the release plate 240 for a portion of its stroke and thereafter will engage a tooth of the ratchet-wheel 235 to rotate the control shaft 75 through an angular distance of one tooth for the remainder of the stroke. During the second half revolution of the drive-shaft 16 the pitman 71 will be moved through a return stroke and thereby will rock the oscillating member 74 through its return stroke. The motion of the oscillating members 74 and 76 thus will be transmitted through the crank-arm 80, link 83, one-way clutch 82, shaft 87, clutch-members 91, 92, see Fig. 1, gears 67, 66, shafts 62, 64, coupling-rods 63, 65, and shafts 50, 26 and 31 connected thereto, to rotate the feed-rolls 24 and 25 and advance the work a distance equal to the required spacing between stitches. During the cycle of operation explained above, the key 77 is presumed to be in the position indicated in Fig. 2 to connect the oscillating members 74 and 76, but it will be understood that when a tie-stitch is desired the key will be rocked to release the oscillating members whereby one of them will be driven from the other with lost-motion to advance the work a reduced increment of movement. Similar tie-stitch mechanism is illustrated and described in detail in my prior application referred to above and therefore does not require further explanation herein.

The drive-shaft 16 will be continuously operated to apply stitches one after the other and the work-feeding means will operate intermittently after the application of each stitch to advance the work predetermined increments of movement between the stitches. During the stitching operation the control shaft 75 will be turned an angular distance corresponding to the width of a tooth on the ratchet-wheel 235 until the arm 261 on the dial 255, see Fig. 3, will have engaged the pivoted lever 266, the arm having been set in the proper notch 256 to apply the desired number of stitches. Engagement of the arm 261 with the lever 266 will cause the latter to be rocked from the position shown in full lines to that indicated by dash-lines in Fig. 3. Thereupon, the abutment 269 on the lever 266 will engage the push-button on the switch 270, see Fig. 14, and close the circuit to the electromagnet 251. The armature 250 of the electromagnet 251 then will operate through the link 252 to rock the bell-crank lever 248 from the position shown in full lines to that indicated by dash-lines in Fig. 16. The end of the link 246 connected to the arm 247 of the bell-crank 248 will thus be caused to engage the adjustable set-screw abutment 141 on the rockable frame 139 to rock the latter in counterclockwise direction as viewed in Fig. 16. This rocking movement of the frame 139 will cause the latch-member 136 to release the pin 137 carried by the link 135, see Fig. 4, whereby the spring 130 will project the pin 129 into the clutch 20 to uncouple the fly-wheel 17 from the drive-shaft 16 at the completion of the cycle of operation of the stitching head 15 to apply the last stitch.

Rocking movement of the frame 139 also will cause its flange 220 to engage the set-screw abutment 219 on the latch-member 209 to rock the latter from the position shown in full lines to that indicated by dash-lines in Fig. 16 to release the latch-member 213 on the arm 214. Due to the profile and arrangement of the spiral cam 206 its high point will be engaged with the follower-roller 205 when the last stitch is being applied, thereby acting to relieve the contact of the detent-shoulders 211 and 212 so that the latch-member 209 may be rocked readily to release the latch-member 213. The spring 207 then will operate to rock the crank-arm 204 as the roller 205 rides off from the high point of the cam 206 to rock the rock-shaft 200 in clockwise direction from the position shown in Fig. 16 to that shown in Fig. 15. This rocking movement of the rock-shaft 200 to the position illustrated in Fig. 6 will release the lever 165 to be actuated by the spring 168 to release the plunger 155 of the switch 150. The plunger 155 of the switch 150 thus will be operated by the spring 156 to open the circuit to the electromagnet 95. Upon deenergization of the electromagnet 95 the spring 59 will shift the clutch-member 57 toward the clutch-member 55 to frictionally engage the clutch-disks 58. Movement of the shifting fork 102 by the clutch-member 57 will be transmitted through the connecting rod 104 to cause the roller 109 to engage the abutment 113 on the arm 112 to rock the shaft 106 and shifting fork 110 to disengage the clutch-member 92 from the clutch-member 91. Thus, the intermittently operating driving means will be disconnected from the feed-rolls 24 and 25 and the continuously operating driving means will be connected thereto through the clutch-disks 58. The feed-rolls 24 and 25 then will be driven at high speed to discharge the stitched carton from the machine and advance the next carton-blank into position to be stitched.

Simultaneously with the release of the lever 165 and switch 150 the arm 194 will be rocked in counterclockwise direction from the position shown in Fig. 9 to that shown in Fig. 6 to release the frame 175 which will drop by gravity against the action of the relatively weak spring 199 to lower the abutment 174. The abutment 174 then will ride on the tail end of the stitched carton-blank W as it is discharged from the machine as indicated in Fig. 10 in position to be engaged by the forward end of the next carton W to be stitched. Due to the relatively long length of the pivoted frame 175 the abutment 174 will move substantially vertically so that no appreciable space need occur between the stitched carton and the next carton-blank to be stitched. The stitched carton W is compressed by the stitching operation so that it will be thinner than the new carton-blank being fed downward, insuring that the forward edge of the latter will engage the abutment-plate when it is positioned closely adjacent the rearward edge of the stitched carton, see Fig. 10.

Rocking movement of the rock-shaft 200 as explained above will swing the arm 230 away from the arm 126 to release the brake-band 122 from its engagement with the brake-drum 121 to permit the feed-rolls 24 and 25 to rotate freely at high speed.

Simultaneously with the operation of the rockable frame 139 the bell-crank lever 248 operating through the link 246 will rock the release-plate 240 in counterclockwise direction, as viewed in Fig. 2, against the action of the spring 244, see Fig. 15. Rocking movement of the release-plate 240 will cause its lobes 241 and 242 to engage the pawls 236 and 238 to release them from engagement with the teeth on the ratchet-wheel 235. Upon release of the pawls 236 and 238 the clock-spring 273 in the housing 274, see Fig. 3, will rotate the control shaft 75 to return it to initial position where its motion is arrested by the engagement of the lever 275 in a notch on the control shaft as explained more fully in my application referred to above. At the end of the return movement of the control shaft 75 the projecting end of the arm 257 on the dial 255 will engage the lever 266 and rock it from the position indicated by dash-lines to the position shown in full lines in Fig. 3. A complete cycle of operation of the machine, as above explained, is again initiated by merely inserting another carton-blank W into the machine. The machine may be adjusted to apply any predetermined number of stitches by merely turning the hub 258 on the control shaft 75 and rocking the arm 261 into engagement with the proper slot 256 as indicated by suitable indicia.

It has been determined that with certain types of carton-blanks W the forward edges of the folded sides may be squared or, in other words, alined with the forward edge of the body-portion of the blank by loosening the bottom feed-rolls 25 for free rotation on their shaft 31. Most of the carton-blanks W, especially those of large size and heavy stock, can be squared only within definite limits. In such cases it is desirable to have both the upper and lower feed-rolls positively driven. With certain other very common types of carton-blanks W of small size and light stock, however, the folded sides may become skewed to one or the other of the positions illustrated in Figs. 19 and 23. The skewing of the folded sides of such carton-blanks may be caused by improper scoring or by the improper technique of the operator in folding the carton-blanks and inserting them into the machine. Such carton-blanks with the folded sides skewed will be automatically squared as they are fed into the present improved machine if the lower feed-rolls are loose on the shaft 31.

The reason for the squaring of the folded sides with respect to the body-portion of the blank is not readily understood, but it is believed that the squaring is due to relative movement between the upper and lower feed-rolls 24 and 25. For example, when the folded sides of a carton-blank are skewed rearwardly with respect to the body-portion as indicated in Figs. 19 and 20 the forward edge of the body portion of the carton-blank W will engage the abutment 174 of the gauge 142 first. It has been demonstrated that the positively driven upper feed-rolls 24 then will operate to feed the folded sides of the blank forwardly relative to its body-portion which is held by the abutment 174 of the gauge 142 until the forward edges of the folded sides aline with the forward edge of the body-portion as indicated in Figs. 21 and 22; the advance of the upper rolls relatively of the lower rolls being indicated by the short radial lines in Fig. 22. When the folded sides of the carton-blank W are skewed with their inner corners forward of the edge of the body-portion as indicated in Figs. 23 and 24 the forward edges of the folded sides of the blank will engage the abutment 174 of the gauge 142 first and, being positively driven will act, to positively shift the abutment forwardly. Upon operation of the switch 150 the continuously operating driving means will be disconnected from the feed-rolls 24 and the intermittently operating driving means will be connected thereto which will act to decelerate the rotation of the upper feed-rolls 24. The lower feed-rolls 25, however, are free to rotate and it is considered that due to their momentum and the momentum of the body-portion of the carton-blank the latter will move forwardly with respect to the folded sides until its edge engages the abutment whereby its forward edge will aline with the forward edges of the folded sides as indicated in Figs. 25 and 26. Whatever the reason for the squaring action, it results undoubtedly from the free rotation of the lower feed-rolls 25 on the shaft 31 and will not take place if the upper feed-rolls 24 are loose on the shaft 26 and the lower feed-rolls 25 are fast on the shaft 31.

It will be observed from the foregoing specification that the present invention provides a machine for stitching the seams of carton-blanks or similar work with the work fed against the depending abutment of a movable gauge to initiate a stitching operation and then fed intermittently to space the stitches along the seam. It will be observed further that the present invention provides for lightly gripping the work as it is fed to and discharged from the machine and firmly gripping the work during a stitching operation. Moreover, it is to be noted that the present invention provides a novel form of abutment-plate for operating the gauge, with the plate movable substantially vertically to insure the initiation of a stitching operation when a carton-blank is fed into position closely adjacent the one being stitched. It will be observed still further that the present invention provides a novel form of operating means for moving the feed-rolls toward each other to grip the work firmly, withdrawing the abutment of the gauge from the path of movement of the work, holding the intermittently operating means connected to drive the feed-rolls and applying a brake to the feed-rolls to prevent back-lash or overrunning of the feed-rolls. In addition, the present invention provides a construction and arrangement of elements which operate to square the edges of the folded sides of a carton-blank with the forward edge of the body-portion thereof when the sides become skewed out of alinement.

While a preferred form of the machine is herein shown and described, by way of illustration, it is to be understood that modifications may be made in the construction and arrangement of its parts without departing from the spirit or scope of the invention. Therefore, without limiting myself in this respect, I claim:

1. In a machine of the type indicated, wire-stitching means, work-feeding means, intermittently operating means for driving the work-feeding means, work-operated means for connecting the work-feeding means to be driven by the intermittently operating means and for initiating operation of the wire-stitching means, and means actuated by the operation of the wire-stitching means for holding the work-feeding means connected to the intermittently operating driving means, said holding means being adapted to permit release of the work-operated means.

2. In a machine of the type indicated, wire-stitching means, work-feeding means, intermittently operating means for driving the work-feeding means, work-operated means for connecting the work-feeding means to be driven by the intermittently operating means and for initiating operation of the wire-stitching means, means actuated by the operation of the wire-stitching means for holding the work-feeding means connected to the intermittently operating driving means whereby to permit release of the work-operated means, and means operative after a predetermined number of stitches have been applied for arresting the operation of the wire-stitching means and disconnecting the work-feeding means from the intermittently operating driving means.

3. In a machine of the type indicated, wire-stitching means, work-feeding means, continuously operating means for driving the work-feeding means, intermittently operating means for driving the work-feeding means, work-operated means for disconnecting the continuously operating means from the work-feeding means, connecting the intermittently operating means to the work-feeding means and initiating the operation of the wire-stitching means, and means actuated by the operation of the wire-stitching means for holding the work-feeding means connected to the intermittently operating driving means whereby to permit release of the work-operated means.

4. In a machine of the type indicated, wire-stitching means, work-feeding means, intermittently operating means for driving the work-feeding means, means for connecting the work-feeding means to be driven by the intermittently operating driving means and for initiating operation of the wire-stitching means, electrical means for operating said connecting means, work-operated means for energizing the electrical means, means actuated by the operation of the wire-stitching means for maintaining the electrical means energized to hold the work-feeding means connected to the intermittently operating driving means whereby the work-operated means may be withdrawn from engagement with the work.

5. In a machine of the type indicated, wire-stitching means, work-feeding means, intermittently operating means for driving the work-feeding means, clutch-means for connecting the work-feeding means to be driven by the intermittently operating means and initiating the operation of the wire-stitching means, electromagnetic means for operating the clutch-means, electric circuits for the electromagnetic means, switches in the electric circuits, a freely movable gauge operable by the work for closing the switches, and means actuated by the operation of the wire-stitching means for maintaining the switch in the circuit for connecting the work-feeding means with the intermittently operating means closed whereby to permit the gauge to be withdrawn from engagement with the work.

6. In a machine of the type indicated, wire-stitching means, work-feeding means, intermittently operating driving means, means for connecting the work-feeding means to be driven by the intermittently operating driving means and for initiating operation of the wire-stitching means, electrical means for operating the last-named means, a freely movable gauge operable by movement of the work for energizing the electrical means, and means actuated by the operation of the wire-stitching means for withdrawing the gauge from engagement with the work.

7. In a machine of the type indicated, wire-stitching means, work-feeding means, intermittently operating driving means, means for connecting the work-feeding means to be driven by the intermittently operating driving means and for initiating operation of the wire-stitching means, electrical means for operating said connecting means, a freely movable gauge operable by the movement of the work for energizing the electrical means, and means actuated by the operation of the wire-stitching means for simultaneously withdrawing the gauge from engagement with the work and maintaining the electrical means energized to hold the work-feeding means connected to the intermittently operating driving means.

8. In a machine of the type indicated, wire-stitching means, work-feeding means, intermittently operating driving means, means for connecting the work-feeding means to be driven by the intermittently operating driving means and for initiating the operation of the wire-stitching means, electromagnetic means for operating said connecting means, electric circuits for the electromagnetic means, switches in the electric circuits, a freely movable gauge operable by movement of the work for closing the switches, and means actuated by the operation of the wire-stitching means for simultaneously withdrawing the gauge from engagement with the work and engaging the switch in the circuit for connecting the work-feeding means to the intermittently operating driving means whereby to hold the switch closed and the circuit energized.

9. In a machine of the type indicated, wire-stitching means, work-feeding means adapted to advance the work intermittently during a stitching operation and to eject the work after a stitching operation is completed, means for controlling the operation of the work-feeding means, a gauge movable by the work for initiating the operation of the wire-stitching means and actuating the control means for the work-feeding means to cause the latter to advance the work intermittently between stitches, and means actuated by the operation of the wire-stitching means for simultaneously withdrawing the gauge from engagement with the work and holding the control means for the work-feeding means in operative condition to advance the work intermittently.

10. In a machine of the type indicated, wire-stitching means, work-feeding means, continuously operating means for driving the work-feeding means, intermittently operating means for driving the work-feeding means, said continuously operating driving means being normally connected to drive the feeding means to feed the work to the wire-stitching means, a gauge operated by the movement of the work, means actuated by the gauge for disconnecting work-feeding means from the continuously operating driving means, connecting the intermittently operating driving means with the work-feeding means and initiating the operation of the wire-stitching means, and means actuated by the operation of the wire-stitching means for withdrawing the gauge from engagement with the work.

11. In a machine of the type indicated, wire-stitching means, a pair of opposed feed-rolls for feeding the work, continuously operating means for driving said feed-rolls, intermittently operating means for driving the feed-rolls, said continuously operating driving means operating the feed-rolls to feed the work to the wire-stitching means, a gauge operated by the movement of the work, means actuated by the gauge for disconnecting the continuously operating driving means from the feed-rolls, connecting the intermittently operating means to drive the feed-rolls and initiating the operation of the wire-stitching means, and means actuated by the operation of the wire-stitching means for withdrawing the gauge from engagement with the work.

12. In a machine of the type indicated, wire-stitching means, a pair of opposed feed-rolls for feeding the work during a stitching operation and ejecting the work after a stitching operation, said feed-rolls being normally spaced to grip the work lightly and relatively movable to grip the work firmly, and means operated by movement of the work for initiating the operation of the wire-stitching means and moving the feed-rolls toward each other to grip the work firmly.

13. In a machine of the type indicated, wire-stitching means, a pair of opposed feed-rolls for feeding the work, said feed-rolls normally being spaced to grip the work lightly to feed it to the wire-stitching means and movable toward each other to grip the work firmly, a freely movable gauge adapted to be engaged by the work as it is fed by the feed-rolls and operable to initiate the operation of the wire-stitching means, and means for moving the feed-rolls toward each other to grip the work firmly during a stitching operation.

14. In a machine of the type indicated, wire-stitching means, a pair of opposed feed-rolls for feeding the work, said feed-rolls normally being spaced to grip the work lightly to feed it to the wire-stitching means and discharge it therefrom and movable toward each other to grip the work firmly during a stitching operation, means operated by movement of the work as it is fed to the feed-rolls for initiating the operation of the wire-stitching means, and means actuated by the operation of the wire-stitching means for moving the feed-rolls toward each other to grip the work firmly.

15. In a machine of the type indicated, wire-stitching means, a pair of opposed feed-rolls for feeding the work, said feed-rolls normally being spaced to grip the work lightly to feed it to the wire-stitching means and movable toward each other to grip the work firmly during a stitching operation, a freely movable gauge adapted to be engaged by the work as it is fed by the feed-rolls and operative to initiate the operation of the wire-stitching means, means actuated by the operation of the wire-stitching means for moving the feed-rolls toward each other to grip the work firmly, and means operative after a predetermined number of stitches have been applied to arrest the operation of the wire-stitching means and release the feed-rolls to permit them to move to their normally spaced relationship.

16. In a machine of the type indicated, wire-stitching means, a pair of opposed feed-rolls for feeding the work, said feed-rolls normally being spaced to grip the work lightly and movable toward each other to grip the work firmly, continuously operating means for driving the feed-rolls, intermittently operating means for driving the feed-rolls, means actuated by movement of the work for disconnecting the feed-rolls from the continuously operating driving means, connecting the feed-rolls to be driven by the intermittently operating means and initiating the operation of the wire-stitching means, and means actuated by the operation of the wire-stitching means for relatively moving the feed-rolls toward each other to grip the work firmly during a stitching operation.

17. In a machine of the type indicated, wire-stitching means, a pair of opposed feed-rolls for feeding the work, said feed-rolls normally being spaced to grip the work lightly and movable toward each other to grip the work firmly, intermittently operating means, means for connecting the feed-rolls to be driven by the intermittently operating means and for initiating the operation of the wire-stitching means, and means actuated by the operation of the wire-stitching means for moving the opposed feed-rolls toward each other to grip the work firmly and to retain the work-feeding means connected to the intermittently operating driving means whereby to permit release of said connecting means.

18. In a machine of the type indicated, wire-stitching means, a pair of opposed feed-rolls for feeding the work, said feed-rolls normally being spaced to grip the work lightly and movable toward each other to grip the work firmly, intermittently operating means for driving the feed-rolls, a freely movable gauge adapted to be actuated by movement of the work to connect the feed-rolls to be driven by the intermittently operating driving means and to initiate the operation of the wire-stitching means, and means actuated by the operation of the wire-stitching means for moving the opposed feed-rolls toward each other to grip the work firmly and also acting to retain the feed-rolls connected to the intermittently operating driving means and to withdraw the gauge from engagement with the work.

19. In a machine of the type indicated, wire-stitching means, work-feeding means, intermittently operating driving means, means for connecting the work-feeding means to be driven by the intermittently operating driving means and for initiating the operation of the wire-stitching means, a brake for the work-feeding means, and means actuated by the operation of the wire-stitching means for applying the brake.

20. In a machine of the type indicated, wire-stitching means, work-feeding means, continuously operating means for driving the feeding means, intermittently operating means for driving the work-feeding means, means for disconnecting the work-feeding means from the continuously operating driving means, connecting the work-feeding means to be driven by the intermittently operating driving means and initiating the operation of the wire-stitching means, a brake for the work-feeding means, and means actuated by the operation of the wire-stitching means for applying the brake.

21. In a machine of the type indicated, wire stitching means, a pair of opposed feed-rolls for feeding the work, continuously operating means for driving the feed-rolls to feed the work to the wire-stitching means and discharge it therefrom, intermittently operating means for driving the feed-rolls to feed the work between stitches during a stitching operation, means actuated by the work as it is advanced by the feed-rolls to disconnect the continuously operating driving means from the feed-rolls, connect the intermittently operating driving means to the feed-rolls and initiate the operation of the wire-stitching means, a brake for the feed-rolls, and means actuated by the operation of the wire-stitching means for applying the brake.

22. In a machine of the type indicated, wire-stitching means, a pair of opposed feed-rolls for feeding the work, continuously operating means for driving the feed-rolls to feed the work to the wire-stitching means and discharge it therefrom, intermittently operating means for driving the feed-rolls to advance the work between stitches during a stitching operation, means for disconnecting the continuously operating driving means from the feedrolls, connecting the intermittently operating driving means to the feed-rolls and initiating the operation of the wire-stitching means, a brake for the feed-rolls, means actuated by the operation of the wire-stitching means for applying the brake, and means operative after a predetermined number of stitches have been applied for disconnecting the intermittently operating driving means from the feed-rolls, connecting the continuously operating means to drive the feed-rolls and release the brake applying means.

23. In a machine of the type indicated, wire-stitching means, work-feeding means, intermittently operating means for driving the work-feeding means, a freely movable gauge operable by the work for connecting the work-feeding means to be driven by the intermittently operating driving means and initiating the operation of the wire-stitching means, a brake for the work-feeding means, and means actuated by the operation of the wire-stitching means for holding the work-feeding means connected to the intermittently operating driving means, withdrawing the gauge from engagement with work and applying the brake.

24. In a machine of the type indicated, wire-stitching means, work-feeding means, continuously operating means for driving the work-feeding means, intermittently operating means for driving the work-feeding means, a freely movable gauge operable by the work for disconnecting the continuously operating driving means from the work-feeding means, connecting the work-feeding means to be driven by the intermittently operating driving means and initiating the operation of the wire-stitching means, a brake for the work-feeding means, and means actuated by the operation of the wire-stitching means for holding the work-feeding means connected to the intermittently operating driving means, withdrawing the gauge from engagement with the work and applying the brake.

25. In a machine of the type indicated, wire-stitching means, a pair of opposed feed-rolls for feeding the work, said pair of feed-rolls being normally spaced to grip the work lightly and movable toward each other to grip the work tightly, intermittently operating means for driving the feed-rolls, means for connecting the work-feeding means to be driven by the intermittently operating means and initiating the operation of the wire-stitching means, a brake for the feed-rolls, and means actuated by the operation of the wire-stitching means for moving the opposed feed-rolls toward each other to tightly grip the work and applying the brake.

26. In a machine of the type indicated, wire-stitching means, a pair of opposed feed-rolls for feeding the work, said feed-rolls normally being spaced to grip the work lightly and movable toward each other to grip the work firmly, continuously operating means for driving the feed-rolls, intermittently operating means for driving the feed-rolls, a freely movable gauge operable by the work for disconnecting the continuously operating driving means from the feed-rolls, connecting the intermittently operating means to drive the feed-rolls and initiating the operation of the wire-stitching means, a brake for the feed-rolls, and means actuated by the operation of the wire-stitching means for holding the feed-rolls connected to the intermittently operating driving means, moving the feed-rolls toward each other to grip the work firmly, withdrawing the gauge from engagement with the work and applying the brake.

27. In a machine of the type indicated, a prime-mover wire-stitching means, work-feeding means normally driven by the prime-mover, intermittently operating means, clutch-means for simultaneously disconnecting the work-feeding means from the prime-mover and connecting it to be driven by the intermittently operating means, a second clutch-means for connecting the wire-stitching means and intermittently operating means to be driven from the prime mover, means for initiating the operation of the first and second-mentioned clutch-means in timed sequence, and means actuated by the operation of the wire-stitching means for holding the first-mentioned clutch-means operative whereby to permit release of the means for initiating the operation of said clutch-means.

28. In a machine of the type indicated, a prime-mover, wire-stitching means, work-feeding means normally driven by the prime-mover, intermittently operating means, clutch-means for simultaneously disconnecting the work-feeding means from the prime-mover and connecting it to be driven by the intermittently operating means, a second clutch-means for connecting the wire-stitching means and intermittently operating means to be driven from the prime-mover, electromagnetic means for operating the clutch-means, electric circuits for the electromagnetic means, switches in the circuits, a work-operated gauge for operating the switches in timed sequence to initiate the operation of the first and second-mentioned clutch-means, and means actuated by the operation of the wire-stitching means to engage the switch for controlling the first-mentioned clutch-means to hold it closed and to withdraw the work-operated gauge from engagement with the work.

29. In a machine of the type indicated, a prime-mover, wire-stitching means, a pair of opposed feed-rolls normally driven by the prime-mover, said feed-rolls being normally spaced to grip the work lightly and movable toward each other to grip the work firmly, intermittently operating means, clutch-means for simultaneously disconnecting the feed-rolls from the prime-mover and connecting them to be driven by the intermittently operating means, a second clutch-means for connecting the wire-stitching means and intermittently operating means to be driven from the prime-mover, means for initiating the operation of the first and second-mentioned clutch-means in timed sequence, and means actuated by the operation of the wire-stitching means for relatively moving the feed-rolls toward each other to grip the work firmly.

30. In a machine of the type indicated, a prime-mover, wire-stitching means, work-feeding means normally driven by the prime-mover, intermittently operating means, clutch-means for simultaneously disconnecting the work-feeding means from the prime-mover and connecting the work-feeding means to be driven by the intermittently operating means, a second clutch-means for connecting the wire-stitching means and intermittently operating means to be driven from the prime-mover, a brake for the work-feeding means, means for initiating the operation of the first and second-mentioned clutch-means in timed sequence, and means actuated by the operation of the wire-stitching means for applying the brake to the work-feeding means.

31. In a machine of the type indicated, wire-stitching means, work-feeding means, intermittently operating means, a gauge operated by the work for connecting the work-feeding means to be driven by the intermittently operating means and initiating the operation of the wire-stitching means, means actuated by the operation of the wire-stitching means to hold the work-feeding means connected to the intermittently operating driving means and to withdraw the gauge from engagement with the work, means for latching the last-named means, and means operative after a predetermined number of stitches have been applied for releasing the latching means.

32. In a machine of the type indicated, wire-stitched means, means for supporting a carton-blank in position to be stitched, a gauge having a sliding support, an arm pivotally mounted at one end on said support, a depending abutment-plate mounted on the arm, said arm being adapted to descend by gravity to carry the abutment-plate into position for engagement by a carton-blank, means actuated by the gauge for initiating the operation of the wire-stitching means, and means actuated by the operation of the wire-stitching means for raising the arm and abutment plate out of the path of movement of the carton-blank.

33. In a machine of the type indicated, wire-stitching means, means for supporting a carton-blank in position to be stitched, a gauge having a sliding support, an arm pivotally mounted at one end on said support, a depending abutment-plate mounted for adjustment along the arm, a stripper slidable along the arm and having a slot for receiving the abutment-plate, said arm being adapted to descend by gravity to move the abutment-plate into position to be engaged by a carton-blank, means actuated by the gauge for initiating the operation of the wire-stitching means, and means actuated by the operation of the wire-stitching means for raising the arm and moving the abutment-plate into the slot in the stripper to disengage the latter from the carton-blank.

34. In a machine of the type indicated, wire-stitching means, means for supporting a carton-blank in position to be stitched, a gauge having a sliding support, an arm pivotally mounted at one end on said support, a depending abutment-plate mounted for adjustment along the arm, said arm being adapted to descend by gravity to move the abutment-plate into position to be engaged by a carton-blank to slide the support, means actuated by the gauge for initiating the operation of the wire-stitching means, means actuated by the operation of the wire-stitching means for raising the abutment-plate out of the path of movement of the carton-blank, means for returning the sliding support to initial position when the abutment-plate is raised out of engagement with the carton-blank, means for discharging the stitched carton, and means operative after a predetermined number of stitches have been applied for releasing the pivoted arm to permit it to descend by gravity whereby the abutment-plate will ride on the stitched carton-blank as it is being discharged to maintain it in position to be engaged by the next carton-blank fed into the machine.

35. In a machine for stitching together the folded sides of carton-blanks, wire-stitching means, a gauge for controlling the operation of the wire-stitching means, said gauge having an abutment engageable by a carton-blank, upper and lower shafts, a feed-roll mounted fast on the upper shaft, a feed-roll mounted loose on the lower shaft for rotation with respect thereto, and means for driving the upper shaft and feed-roll mounted thereon, said feed-rolls operating to feed a carton-blank against the abutment of the gauge and acting to square the forward ends of the folded sides with the forward edge of the body-portion of the carton-blank.

36. In a machine for stitching together the folded sides of carton-blanks, wire-stitching means, a gauge for controlling the operation of the wire-stitching means, said gauge having an abutment engageable by a carton-blank, upper and lower shafts, means for driving the shafts in synchronism, a pair of feed-rolls mounted fast on the upper shaft, and a pair of feed-rolls mounted loose on the lower shaft in cooperative relation to the upper feed-rolls, said feed-rolls operating to feed a carton-blank against the abutment of the gauge and acting to square the forward edges of the folded sides with the forward edge of the body-portion of the carton-blank.

37. In a machine for stitching together the folded sides of carton-blanks, wire-stitching means, a gauge for controlling the operation of the wire-stitching means, said gauge having an abutment engageable by a carton-blank, an upper work-feed shaft journaled for rotation in fixed bearings, a rockable cradle, a lower shaft journaled for rotation on the cradle, a pair of feed-rolls mounted fast on the upper shaft, a pair of cooperating feed-rolls mounted loose on the lower shaft for rotation relatively thereto, means for driving the shafts in synchronism, said feed-rolls cooperating to grip a carton-blank loosely to feed it against the abutment of the gauge and acting to square the forward edges of the folded sides with the forward edge of the body-portion of the carton-blank, means operated by the gauge for initiating operation of the wire-stitching means, and means operated by the wire-stitching means for rocking the cradle to move the lower feed-rolls toward the upper rolls whereby to grip the carton-blank firmly therebetween.

GEORGE H. HARRED.